(12) United States Patent
Seo et al.

(10) Patent No.: US 12,521,839 B2
(45) Date of Patent: Jan. 13, 2026

(54) POLISHING PAD AND PREPARING METHOD OF SEMICONDUCTOR DEVICE USING THE SAME

(71) Applicant: SK enpulse Co., Ltd., Gyeonggi-do (KR)

(72) Inventors: Jang Won Seo, Seoul (KR); Eun Sun Joeng, Gyeonggi-do (KR); Sung Hoon Yun, Seoul (KR); Jong Wook Yun, Seoul (KR)

(73) Assignee: Enpulse Co., Ltd., Chungcheongnam-do (KR)

( * ) Notice: Subject to any disclaimer, the term of this patent is extended or adjusted under 35 U.S.C. 154(b) by 525 days.

(21) Appl. No.: 17/963,544

(22) Filed: Oct. 11, 2022

(65) Prior Publication Data

US 2023/0110921 A1    Apr. 13, 2023

(30) Foreign Application Priority Data

Oct. 12, 2021    (KR) .......................... 10-2021-0134659

(51) Int. Cl.
*B24B 37/22*    (2012.01)
*B24B 37/04*    (2012.01)
(Continued)

(52) U.S. Cl.
CPC ............ *B24B 37/22* (2013.01); *B24B 37/042* (2013.01); *B24B 37/24* (2013.01); *B32B 3/26* (2013.01);
(Continued)

(58) Field of Classification Search
None
See application file for complete search history.

(56) References Cited

U.S. PATENT DOCUMENTS

| 5,287,663 A | * | 2/1994 | Pierce | ..................... B24B 37/22 |
| | | | | 451/539 |
| 5,692,950 A | * | 12/1997 | Rutherford | ........... B24B 37/245 |
| | | | | 51/293 |

(Continued)

FOREIGN PATENT DOCUMENTS

| CN | 102781628 A | 11/2012 |
| CN | 103862365 A | 6/2014 |

(Continued)

OTHER PUBLICATIONS

Machine Translation of JP2015013345A, Jan. 2015 (Year: 2015).*

(Continued)

*Primary Examiner* — Jeffrey A Vonch
(74) *Attorney, Agent, or Firm* — IP & T GROUP LLP

(57) ABSTRACT

The present disclosure is to provide a polishing pad which is capable of providing physical properties corresponding to various polishing purposes for various polishing objects through the subdivided structural design in a thickness direction, and of securing environmental friendliness by applying a recycled or recyclable material to at least some components, in relation to disposal after use, unlike the conventional polishing pad. Specifically, it includes a polishing layer, wherein the polishing layer includes a polishing variable layer having a polishing surface; and a polishing constant layer disposed on a rear surface side of the polishing variable layer opposite to the polishing surface.

17 Claims, 4 Drawing Sheets

(51) Int. Cl.
*B24B 37/24* (2012.01)
*B24B 37/26* (2012.01)
*B32B 3/26* (2006.01)
*B32B 5/18* (2006.01)
*B32B 7/02* (2019.01)
*B32B 27/16* (2006.01)
*B32B 27/40* (2006.01)
*H01L 21/306* (2006.01)
*B32B 3/30* (2006.01)
*B32B 7/022* (2019.01)
*H01L 21/67* (2006.01)

(52) U.S. Cl.
CPC .............. *B32B 7/02* (2013.01); *B32B 27/16* (2013.01); *B32B 27/40* (2013.01); *H01L 21/30625* (2013.01); *B24B 37/26* (2013.01); *B32B 3/30* (2013.01); *B32B 5/18* (2013.01); *B32B 7/022* (2019.01); *B32B 2305/72* (2013.01); *B32B 2375/00* (2013.01); *H01L 21/67092* (2013.01); *Y10T 428/24504* (2015.01); *Y10T 428/24942* (2015.01); *Y10T 428/2495* (2015.01); *Y10T 428/24983* (2015.01)

(56) References Cited

U.S. PATENT DOCUMENTS

| | | | | |
|---|---|---|---|---|
| 5,876,269 | A * | 3/1999 | Torii | B24B 37/22 451/36 |
| 6,306,021 | B1 * | 10/2001 | Masumura | B24B 37/24 451/526 |
| 6,746,311 | B1 * | 6/2004 | Kessel | B24D 11/00 51/293 |
| 2002/0086615 | A1 * | 7/2002 | Moon | B24B 37/26 451/25 |
| 2004/0055223 | A1 * | 3/2004 | Ono | B24D 3/28 51/293 |
| 2004/0137831 | A1 * | 7/2004 | Kollodge | B24B 37/22 451/41 |
| 2005/0189065 | A1 * | 9/2005 | Boldizar | B24B 37/205 156/324 |
| 2006/0148393 | A1 * | 7/2006 | Ono | B24D 3/28 451/526 |
| 2007/0254564 | A1 * | 11/2007 | Song | B24D 11/02 451/64 |
| 2009/0093202 | A1 * | 4/2009 | Fukuda | B29C 44/24 451/533 |
| 2010/0012269 | A1 * | 1/2010 | Jensen | B24B 37/22 156/289 |
| 2011/0045753 | A1 * | 2/2011 | Shiro | B24B 37/26 451/540 |
| 2011/0130077 | A1 * | 6/2011 | Litke | C08G 18/10 451/28 |
| 2011/0256817 | A1 * | 10/2011 | Fukuda | B24B 37/24 451/526 |
| 2011/0269380 | A1 * | 11/2011 | Wang | B24B 37/22 451/41 |
| 2013/0137350 | A1 * | 5/2013 | Allison | B24B 37/16 451/550 |
| 2014/0106652 | A1 * | 4/2014 | Itoyama | C08G 18/10 451/526 |
| 2014/0206268 | A1 * | 7/2014 | Lefevre | B24B 37/22 451/529 |
| 2014/0357163 | A1 * | 12/2014 | Murnane | C08G 18/3278 451/527 |
| 2014/0357169 | A1 * | 12/2014 | Murnane | B24B 37/24 451/527 |
| 2014/0357170 | A1 * | 12/2014 | Qian | B24B 37/22 451/527 |
| 2015/0065013 | A1 * | 3/2015 | Jensen | B24B 37/205 451/41 |
| 2015/0375362 | A1 * | 12/2015 | Qian | B24B 37/24 216/22 |
| 2016/0144477 | A1 * | 5/2016 | Scott | B24B 37/24 451/538 |
| 2016/0375554 | A1 * | 12/2016 | Qian | B24B 37/24 51/298 |
| 2016/0379840 | A1 * | 12/2016 | Qian | H01L 21/3212 438/693 |
| 2017/0043451 | A1 * | 2/2017 | Zhu | C08G 18/7671 |
| 2017/0151648 | A1 * | 6/2017 | Huang | B24D 18/0045 |
| 2018/0071888 | A1 * | 3/2018 | Weis | B24B 53/017 |
| 2018/0281148 | A1 * | 10/2018 | Lehuu | B24D 3/28 |
| 2018/0281154 | A1 * | 10/2018 | Chen | B24B 37/22 |
| 2019/0061097 | A1 * | 2/2019 | Seo | C08G 18/1825 |
| 2019/0168356 | A1 * | 6/2019 | Qian | B24B 37/044 |
| 2021/0122007 | A1 * | 4/2021 | Yun | B24B 37/24 |
| 2022/0410337 | A1 * | 12/2022 | Yun | B24B 37/24 |

FOREIGN PATENT DOCUMENTS

| | | | | |
|---|---|---|---|---|
| CN | 104149023 | A * | 11/2014 | .......... B24B 37/24 |
| CN | 105904352 | A * | 8/2016 | ......... C08G 18/3215 |
| CN | 106046313 | A * | 10/2016 | ......... C08G 18/7642 |
| CN | 108789135 | A * | 11/2018 | ............ B24B 37/24 |
| CN | 113334243 | A * | 9/2021 | ............ B24B 37/20 |
| JP | 2002075933 | A * | 3/2002 | |
| JP | 2009214272 | A * | 9/2009 | |
| JP | 2011212822 | A * | 10/2011 | |
| JP | 2015013345 | A * | 1/2015 | |
| JP | 2018051744 | A * | 4/2018 | |
| JP | 2021057524 | A * | 4/2021 | |
| KR | 10-1177781 | B1 | 8/2012 | |
| KR | 10-2012-0123130 | A | 11/2012 | |
| KR | 10-1924566 | B1 | 12/2018 | |
| WO | WO-9907518 | A1 * | 2/1999 | ............ B24B 49/16 |

OTHER PUBLICATIONS

Machine Translation of JP2018051744A, Apr. 2018 (Year: 2018).*
Machine Translation of KR101924566B1, Dec. 2018 (Year: 2018).*
Office Action for the Taiwanese Patent Application No. 111137929 issued by the Taiwanese Patent Office on Nov. 27, 2023.
Office Action for the Korean Patent Application No. 10-2021-0134659 issued by the Korean Intellectual Property Office on Jul. 5, 2023.
Office Action for Chinese Patent Application No. 202211200798.5 issued by the Chinese Patent Office on Jun. 19, 2025.

* cited by examiner

[FIG. 1]
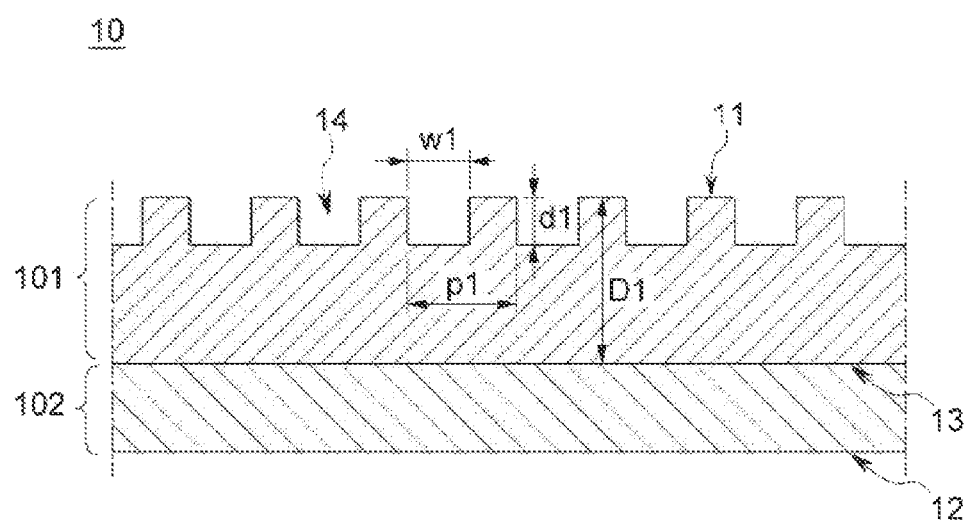

[FIG. 2]
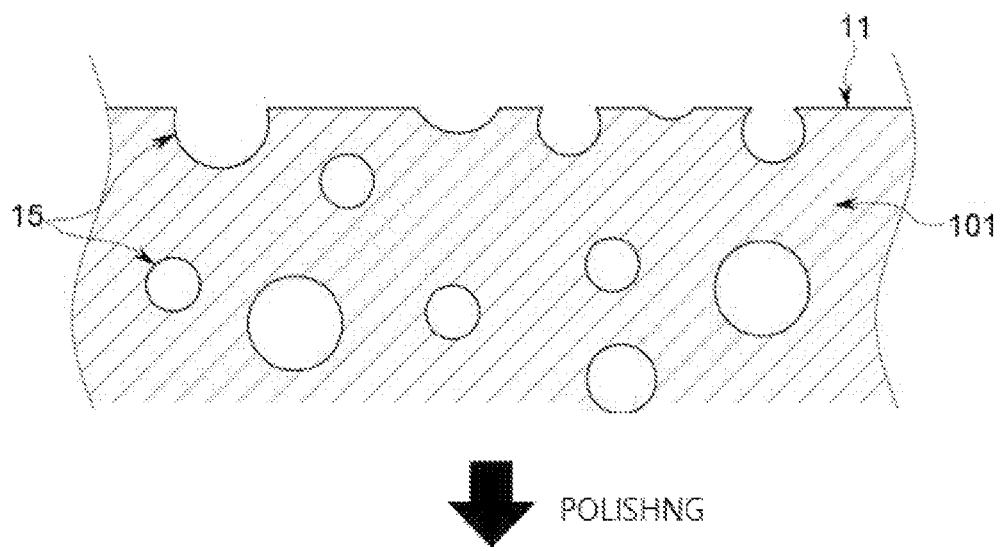
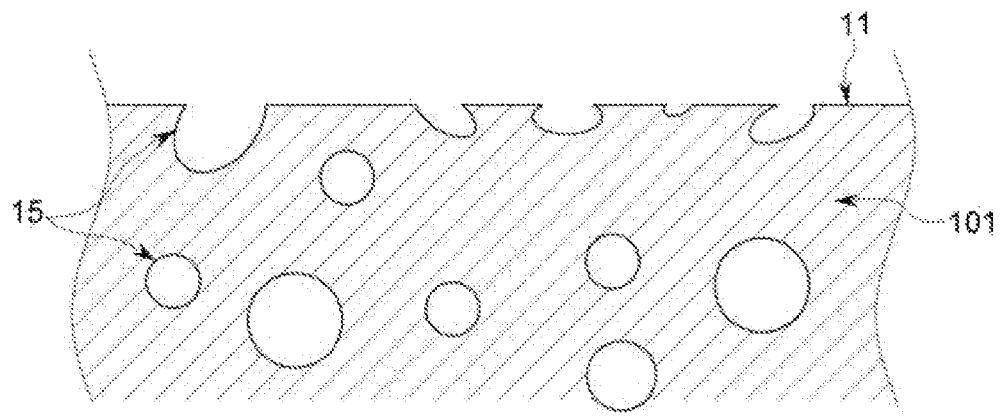

[FIG. 3]
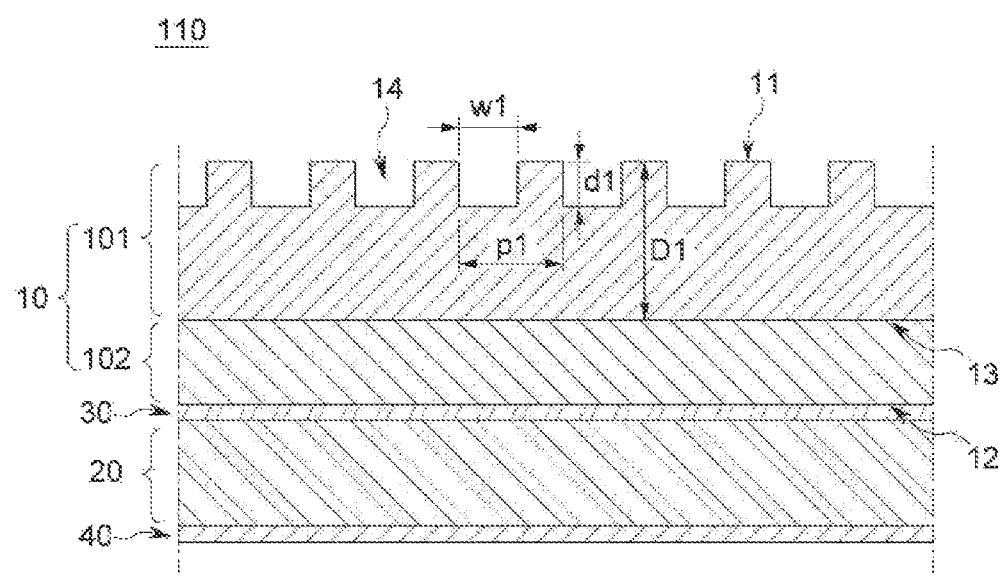

[FIG. 4]
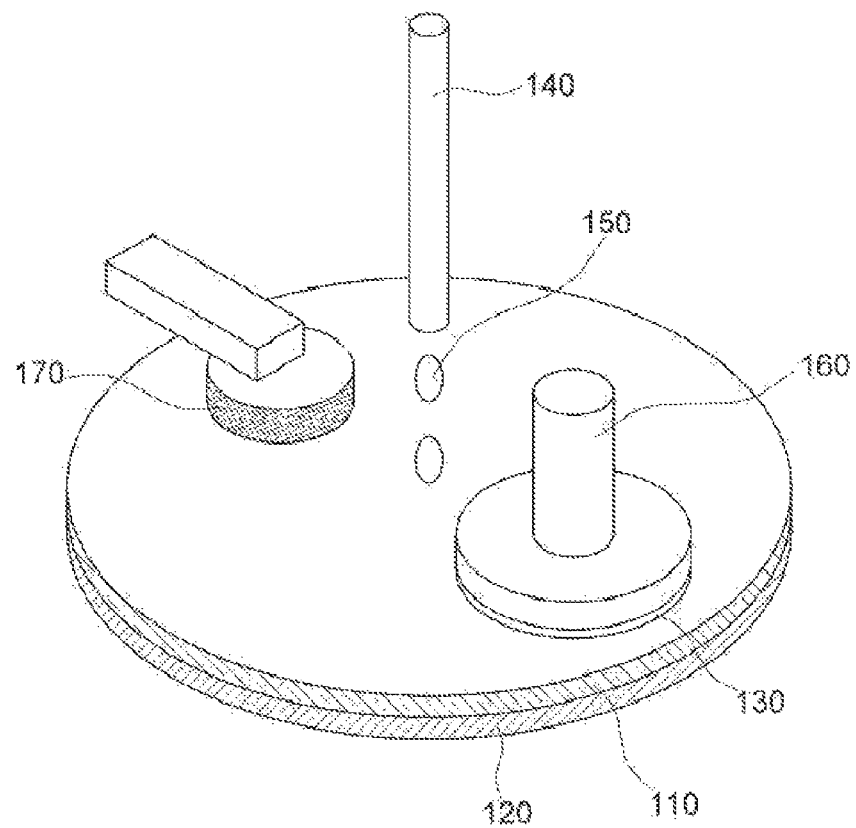

POLISHING PAD AND PREPARING METHOD OF SEMICONDUCTOR DEVICE USING THE SAME

CROSS-REFERENCE OF RELATED APPLICATIONS

This application claims priority to Korean Patent Application No. 10-2021-0134659 filed on Oct. 12, 2021, which are incorporated herein by reference in their entirety.

TECHNICAL FIELD

This disclosure relates to a pad applied to a polishing process, and to a technique for applying the same to a method for preparing a semiconductor device.

BACKGROUND ART

A chemical mechanical planarization (CMP) or chemical mechanical polishing (CMP) process may be performed for various purposes in various technical fields. The CMP process may be performed on a predetermined polished surface of a polishing object for the purposes of the planarization of the polished surface, removal of aggregated materials therefrom, resolution of crystal lattice damage, removal of scratches and contamination sources, and the like.

The CMP process technology of the semiconductor process may be classified according to the polishing object film quality or the surface shape after the polishing. For example, it may be divided into single silicon or poly silicon according to the polishing object film quality, and may be classified into various oxide film CMP processes which are discriminated by the kinds of impurities, or into metal film CMP processes which are discriminated by tungsten (W), copper (Cu), aluminum (Al), ruthenium (Ru), tantalum (Ta), and the like. And, according to the surface shape after polishing, it may be classified into a process of alleviating the roughness of the substrate surface, a process of flattening the difference of level caused by multi-layer circuit wirings, and an element isolation process for selectively forming circuit wirings after polishing.

These CMP processes may be applied a plurality of times in the preparing process of a semiconductor device. A semiconductor device includes a plurality of layers, and each layer includes complex and fine circuit patterns. Additionally, in these days, semiconductor devices are developing toward further reduced individual chip sizes, and more complex and finer patterns in each layer. Accordingly, in the process of preparing a semiconductor device, the CMP processes have been employed more widely not only for the purpose of flattening circuit wirings, but also for the separation of circuit wirings, the application of improvement of the wiring surface, and the like, and as a result, more elaborate and reliable CMP performances are required.

The polishing pad used in these CMP processes, which is a component for a process of processing the polished surface to a required level through friction, can be considered as one of the most important factors in the thickness uniformity of the polishing object after polishing, the flatness of the polished surface, and the polishing quality.

SUMMARY OF INVENTION

Technical Problem

An embodiment of the present disclosure is to provide a polishing pad which is capable of providing physical properties corresponding to various polishing purposes for various polishing objects through the subdivided structural design in a thickness direction, and whose long-term polishing performance is not lowered based on appropriate variability in structural changes during the polishing process. Additionally, in relation to the disposal of the polishing pad after use, it is intended to achieve an environment-friendly purpose by applying a recycled or recyclable material to at least some components, unlike the conventional polishing pad.

Another embodiment of the present disclosure is to provide a method for preparing a semiconductor device to which the polishing pad is applied, the method capable of securing diversity of a polished surface of a semiconductor substrate, ensuring excellent polishing flatness and the lowest level of defect generation while securing an appropriate polishing rate for each polished surface, and further, leading to improved results in terms of process productivity and economic feasibility

Solution to Problem

An embodiment provides a polishing pad including: a polishing layer, wherein the polishing layer includes a polishing variable layer having a polishing surface; and a polishing constant layer disposed on a rear surface side of the polishing variable layer opposite to the polishing surface, wherein the polishing constant layer includes a cured product of a first composition including a first urethane-based prepolymer, and wherein the first urethane-based prepolymer is a reaction product of a first alcohol component including a first polyol having a hydroxyl value (Hydroxyl number, OH-Value) of about 200 mgKOH/g to about 900 mgKOH/g; and a first isocyanate component.

An interface between the polishing variable layer and the polishing constant layer may be a separable interface.

The polishing variable layer and the polishing constant layer each include at least one layer.

The isocyanate group (—NCO) content in the first composition may be 8% to 20% by weight.

The first composition may further include a first curing agent, and the first curing agent may include a compound including one reactive group selected from the group consisting of an amine group (—NH$_2$), a hydroxyl group (—OH), and combinations thereof.

The first curing agent may include a compound having a hydroxyl group (—OH) as the reactive group, and the hydroxyl value (Hydroxyl number. OH-Value) of the compound including the hydroxyl group (—OH) may be more than 600 mgKOH/g and 900 mgKOH/g or less.

The polishing variable layer may include a cured product of a second composition including a second urethane-based prepolymer, wherein the second urethane-based prepolymer may be a reaction product of a second alcohol component including a second polyol having a hydroxyl value (Hydroxyl number, OH-Value) of 50 mgKOH/g or more and less than 200 mgKOH/g; and the second isocyanate component.

The second composition may further include a second curing agent, and the second curing agent may include a compound including one reactive group selected from the group consisting of an amine group (—NH$_2$), a hydroxyl group (—OH), and combinations thereof.

The second curing agent may include a compound having an amine group (—NH$_2$) as the reactive group, wherein the molar ratio of isocyanate groups (—NCO) in the second composition to amine groups (—NH$_2$) in the second curing agent may be 1:0.80 to 1:1.20.

A content of isocyanate groups (—NCO) in the second composition may be 5% to 11% by weight.

In another embodiment of the present disclosure, there is provided a method for preparing a semiconductor device, the method including: providing a polishing pad on a surface plate, the polishing pod including a polishing layer with a polishing surface; and polishing a polishing object while rotating the polishing pad and the polishing object relative to each other under a pressure condition, after arranging the polishing object to be in contact with the polishing surface, wherein the polishing layer includes a polishing variable layer including the polishing surface, and a polishing constant layer disposed on a rear side of the polishing surface of the polishing variable layer, and wherein the polishing constant layer includes a cured product of the first composition including the first urethane-based prepolymer, and the first urethane-based prepolymer is a reaction product of the first alcohol component including a first polyol having a hydroxyl number (OH-Value) of 200 mgKOH/g to 900 mgKOH/g; and the first isocyanate component.

A load by which a polished surface of the polishing object is pressed against the polishing surface of the polishing layer may be from 0.01 psi to 20 psi.

Advantageous Effects

The polishing pad can realize effects that are capable of providing physical properties corresponding to various polishing purposes for various polishing objects through the subdivided structural design in a thickness direction, and of providing long-term polishing performance which is not lowered based on appropriate variability in structural changes during the polishing process. Additionally, in relation to the disposal after use, the polishing pad can secure environmental friendliness by applying a recycled or recyclable material to at least some components, unlike the conventional polishing pad.

The method for preparing a semiconductor device to which the polishing pad is applied can secure diversity of a polished surface of a semiconductor substrate, ensure excellent polishing flatness and the lowest level of defect generation while securing an appropriate polishing rate for each polished surface, and further, lead to improved results in terms of process productivity and economic feasibility.

BRIEF DESCRIPTION OF DRAWINGS

FIG. 1 schematically shows a cross-sectional view of the polishing layer according to an embodiment.

FIG. 2 schematically shows changes in a polishing surface of the first surface according to an embodiment during a polishing process.

FIG. 3 schematically shows a cross-sectional view of the polishing pad according to an embodiment.

FIG. 4 is a schematic view schematically showing a method for preparing a semiconductor device according to an embodiment.

DESCRIPTION OF EMBODIMENTS

Advantages and features of the present disclosure, and methods for achieving them will become apparent with reference to the embodiments or examples to be discussed later. However, the present disclosure is not limited to the embodiments or examples to be disclosed below, but may be implemented in various different forms. However, the embodiments or examples to be specified below are only provided to make the disclosure complete, and to inform those of ordinary skill in the art to which the present disclosure belongs about the scope of the invention, and the right scope of the present disclosure is defined by the scope of the claims.

In the drawings, as needed, the thicknesses of some components are enlarged in order to clearly express the layer or region. Additionally, in the drawings, the thicknesses of some layers and regions are exaggerated for convenience of description. Like reference numerals refer to like components throughout the specification.

Herein, when it is stated that a portion of a layer, film, region, plate, or the like is "on" or "on the top of" another portion, it is construed as including not only the case where it is "directly on" another portion, but also the case where other portion is interposed therebetween. When a portion is described as being "directly on" another portion, it is construed as meaning that there is no other portion therebetween. Additionally, when it is stated that a portion of a layer, film, region, plate, or the like is "under" or "under the bottom of" another portion, it is construed as including not only the case where it is "directly under" another portion, but also the case where other portion is interposed therebetween. When a portion is described as being "directly under" another portion, it is construed as meaning that there is no other portion therebetween.

In the present specification, when representing a numerical range, the meaning of '~equal to or greater than' is construed as including that number or numbers greater than that number. For example, 'equal to or greater than two' means two or other numbers greater than two. In addition, the description of 'from X to Y' for a numerical range is construed as a range including X or Y. For example, 'from 25 to 50' means a numerical range including 25 and 50.

In the present specification, the components modified by 'first', 'second' or the like are described only to distinguish them because the components including such modifiers are different from each other in terms of the higher level configuration, but by such descriptions, they do not construed as including different components or different compositions.

Hereinafter, embodiments according to the present disclosure will be described in detail.

An embodiment provides a polishing pad including: a polishing layer, wherein the polishing layer includes a polishing variable layer having a polishing surface; and a polishing constant layer disposed on a rear surface side of the polishing variable layer opposite to the polishing surface, wherein the polishing constant layer includes a cured product of a first composition including a first urethane-based prepolymer, and wherein the first urethane-based prepolymer is a reaction product of a first alcohol component including a first polyol having a hydroxyl value (Hydroxyl number, OH—Value) of about 200 mgKOH/g to about 900 mgKOH/g; and a first isocyanate component.

FIG. 1 schematically illustrates a cross-sectional view taken in the thickness direction of the polishing layer 10 according to an embodiment. Hereinafter, the terms 'polishing surface' and 'first surface' may be used to refer to the same component.

Referring to FIG. 1, the polishing layer 10 may include the polishing variable layer 101 having the polishing surface 11. Additionally, the polishing layer 10 may include the polishing constant layer 102 disposed on the rear surface side of the polishing surface 11. An interface between the polishing variable layer 101 and the polishing constant layer 102 may be a separable interface. Each of the polishing variable layer 101 and the polishing constant layer 102 may include at least one layer.

Putting it differently, the polishing layer 10 may include a first surface 11, and a second surface 12 which is the rear surface of the first surface. Further, the polishing layer 10 may include at least one separable interface 13 between the first surface 11 and the second surface 12. Herein, the 'separable interface' refers to an interface with respect to which two adjacent layers can be discriminated as discontinuous structures rather than a substantially continuous structure. For example, the separable interface is one that is detached or separated by a predetermined external force, and may correspond to an attachment surface using an adhesive layer as a medium.

The polishing layer 10 may include at least one polishing variable layer 101 which is a region from the first surface 11 to the separable interface 13, and at least one polishing constant layer 102 which is a region from the separable interface 13 to the second surface 12. Herein, the 'polishing variable layer' refers to a region whose physical characteristics, such as structure and shape, and/or chemical characteristics, such as composition, change during a polishing process using the polishing pad, and the 'polishing constant layer' refers to a region whose physical and/or chemical characteristics do not substantially change during a polishing process using the polishing pad. The 'do not substantially change' may be construed as including a case where the physical and/or chemical characteristics are not changed at all, as well as a case where physical and/or chemical characteristics may be slightly changed during the polishing under a pressurized environment and a wet environment, but it is at a fairly insignificant level compared to the polishing variable layer, thus being regarded as a case where there is no substantial change.

FIG. 1 illustratively shows a case where there is one separable interface 13, but if necessary, the polishing layer 10 may include at least two separable interfaces 13 between the first surface 11 and the second surface 12. In this case, the polishing variable layer 101 or the polishing constant layer 102 may include a plurality of layers.

By designing the polishing layer 10 to include at least one polishing variable layer 101 and at least one polishing constant layer 102, precise structural design in the thickness direction is possible, and as a result of the organically interacted physical properties of respective layers stacked in the thickness direction in this way, it is possible to finely and precisely control the polishing performance produced through the polishing surface 11 according to the purpose.

In an embodiment, the polishing variable layer 101 may be from about 30% by volume to about 60% by volume of the total volume of the polishing layer 10, for example, from about 40% by volume to about 60% by volume, or, for example, from about 45% by volume to about 55% by volume. When the volume of the polishing variable layer 101 of the total volume of the polishing layer 10 satisfies the above range, the above-described technical advantages of the polishing variable layer 101 and the polishing constant layer 102 can be secured, and at the same time, it can be advantageous for realizing the process lifespan of the polishing pad at a desired level.

The polishing pad may be employed in polishing processes for various purposes. For example, the polishing pad may be applied to a preparing process of a semiconductor device. Recently, semiconductor devices are required to have a higher degree of integration and a more three-dimensionally complicated structure. In order to meet such requirements, fine process control is essential in the preparing process of a semiconductor device. The semiconductor device includes various materials and various types of thin films, and thus requires a polishing process to have process conditions finely adjusted according to the material and shape of each thin film. The polishing pad is one of these fine process control factors, and the polishing result of the semiconductor device may vary significantly even by minute differences in the structure, material, and shape of the polishing pad.

As described above, the polishing constant layer 102, which is a region whose physical and/or chemical characteristics do not substantially change during the polishing process, does not directly have an influence on the polished surface of the polishing object, but it is laminated with the polishing variable layer 101, enabling the polishing pad to secure an appropriate level of physical/mechanical performance such as overall structural support performance, elasticity, elongation rate and tensile strength, thereby serving as a configuration that directly or indirectly has an influence on the resulting polishing performance.

In this aspect, the polishing constant layer 102 may include a cured product of a first composition having a first urethane-based prepolymer, and its technical advantage can be maximized by applying a first alcohol component including a first polyol having a hydroxyl number (OH-Value) of 200 mgKOH/g to 900 mgKOH/g as the first urethane-based prepolymer; and the reaction product of the first isocyanate component.

In the first urethane-based prepolymer, the 'prepolymer' refers to a polymer having a relatively low molecular weight in which the polymerization degree is stopped at an intermediate stage to facilitate molding in the preparing of a cured product. The prepolymer itself undergoes an additional curing process, such as heating, pressurization or/and the like, or may be mixed with another polymerizable compound, for example, an additional compound such as a heterogeneous monomer or a heterogeneous prepolymer, and reacted, and then may be molded into a final cured product.

Herein, the 'polyol' refers to a compound including at least two hydroxyl groups (—OH) per molecule. In an embodiment, the polyol compound may include a dihydric alcohol compound having two hydroxyl groups, that is, diol or glycol; or a trihydric alcohol compound having three hydroxyl groups, that is, a triol compound.

In an embodiment, the first polyol may be a recycled polyol. Specifically, the first polyol may be a polyol derived from waste of the polishing pad. More specifically, the first polyol may be a polyol derived from a hydrolysis product of the polishing pad waste. The 'polishing pad waste' may refer to a polishing pad discarded after being used in a desired polishing process, or a by-product thrown away in the process of preparing the polishing pad. In general, a polishing pad is a semi-permanent process component, and is a component which must be replaced after being applied to the polishing process for a predetermined period of time because its physical structure and/or chemical properties are no longer suitable for the polishing. In addition, since the polishing pad must provide a polishing surface that meets the polishing purpose, only a portion that can ensure the quality and stability of the polishing object is adopted during the preparing process, and the remaining portion is frequently discarded as by-products. In the case where the used polishing pad, or the by-product of the polishing pad discarded during the preparing process includes the thermosetting polyurethane, it becomes the main culprit of environmental pollution because there is practically no recyclability. Furthermore, as the demand for semiconductors increases in recent years, the quantity of polishing pads discarded after being applied to semiconductor processes, and the preparing by-products of polishing pads are continuously increasing, which makes the environmental pollution problem more serious. Accordingly, when employing the recycled polyol derived from waste of the polishing pad as a component of the polishing constant layer 102, the above-described technical purposes can be achieved, and an advantage of realizing an eco-friendly effect can also be obtained.

The first polyol may have a hydroxyl number (OH-Value) of about 200 mgKOH/g to about 900 mgKOH/g, for example, about 300 mgKOH/g to about 900 mgKOH/g, for example, about 300 mgKOH/g to about 800 mgKOH/g, for example, about 300 mgKOH/g to about 750 mgKOH/g, or, for example, about 450 mgKOH/g to about 650 mgKOH/g. When a polyol having such hydroxyl value is used as the first polyol together with the polishing variable layer, the physical and/or mechanical properties of the polishing constant layer derived therefrom can be advantageous for the realization of polishing performance. In addition, it may be more advantageous for obtaining the first polyol as a recycled polyol by processing the polishing pad waste. That is, when the first polyol is a recycled polyol derived from a hydrolysis product of the polishing pad waste, the recycled polyol may be prepared as an alcohol compound having at least two terminal hydroxyl groups (—OH) by decomposing the polymer chain constituting the polishing pad into a predetermined unit, and It may be easier for the first polyol obtained in this way to satisfy the aforementioned hydroxyl value.

The first polyol may have a weight average molecular weight (Mw) of about 100 g/mol to about 1200 g/mol, for example, about 100 g/mol to about 1000 g/mol, for example, about 100 g/mol to about 950 g/mol, for example, about 100 g/mol to about 800 g/mol, from example, about 100 g/mol to about 750 g/mol, for example, about 100 g/mol to about 700 g/mol, for example, about 100 g/mol to about 650 g/mol, or, for example, about 150 g/mol to about 600 g/mol. Since the first polyol has a main chain structure corresponding to this molecular weight, the first alcohol component and the first isocyanate component react with each other to form a homogeneous urethane material as a whole, and as described above, it may be more advantageous for being obtained as a recycled polyol by processing the polishing pad waste.

In an embodiment, the first alcohol component may further include an additional polyol compound in addition to the first polyol. The additional polyol compound may include, for example, one selected from the group consisting of polyether polyol, polyester polyol, polycarbonate polyol, acryl polyol, and combinations thereof.

Specifically, the additional polyol compound may include one selected from the group consisting of, for example, polytetramethylene ether glycol (PTMG), polypropylene ether glycol, ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol (DEG), dipropylene glycol (DPG), tripropylene glycol, polypropylene glycol, polypropylene triol, and combinations thereof.

The first isocyanate component may use one selected from the group consisting of aromatic diisocyanate, aliphatic diisocyanate, cycloaliphatic diisocyanate, and combinations thereof. For example, the isocyanate compound may include aromatic diisocyanate.

The first isocyanate component may include, for example, one selected from the group consisting of 2,4-toluenediisocyanate (2,4-TDI), 2,6-toluenediisocyanate (2,6-TDI), naphthalene-1,5-diisocyanate, p-phenylenediisocyanate, tolidinediisocyanate, 4,4'-diphenylmethanediisocyanate, hexamethylenediisocyanate, dicyclohexylmethanediisocyanate, 4,4'-dicyclohexylmethanediisocyanate (H12MDI), isophorone diisocyanate, and combinations thereof.

In an embodiment, the first isocyanate component may include an aromatic diisocyanate, and the aromatic diisocyanate may include, for example, 2,4-toluene diisocyanate (2,4-TDI), or may include, for example, 2,4-toluene diisocyanate (2,4-TDI) and 2,6-toluenediisocyanate (2,6-TDI).

In an embodiment, based on 100 parts by weight of the total weight of the first isocyanate component, the amount of the first polyol may be from about 10 parts by weight to about 30 parts by weight, for example, from about 15 parts by weight to about 20 parts by weight. By applying the first polyol in the above-mentioned range relative content ratio with respect to the first isocyanate component, the physical properties of the polishing constant layer derived from the first urethane-based prepolymer may be more advantageous for improving polishing performance to a desired level.

The first isocyanate component may have an isocyanate group content (NCO %) of about 30% to about 65% by weight, for example, about 35% to about 60% by weight, for example, about 40% to about 55% by weight, or, for example, about 40% to about 50% by weight. The 'isocyanate group content (NCO %)' of the first isocyanate component means a percentage of the weight of isocyanate groups (—NCO) that is not reacted and exists as a free reactive group in the component. When the NCO % of the first isocyanate component satisfies the aforementioned range, the reactivity with the first polyol may be optimally realized. More specifically, when the hydroxyl value and/or the weight average molecular weight each satisfy the above-mentioned ranges, it may be advantageous in terms of the reactivity with the first polyol.

The isocyanate group content (NCO %) of the first composition is from about 8% to 20% by weight, for example from about 8% to about 18% by weight, for example, from about 8% to about 15% by weight, for example, from about 9% to about 15% by weight, for example, from about 10% to about 15% by weight, or, for example, greater than about 10% by weight and up to about 15% by weight. The 'isocyanate group content (NCO %)' in the first composition means a percentage of the weight of isocyanate groups (—NCO) that is not reacted and exists as a free reactive group in the composition. The NCO % of the first composition may be calculated based on the total weight of the first composition excluding the first curing agent and the first blowing agent to be described later. When the NCO % of the first composition satisfies the aforementioned range, the polishing constant layer prepared by curing this can have an optimal cross-linking structure, and as a result, it can be more advantageous for the polishing constant layer to be laminated with the polishing variable layer to provide excellent polishing performance through the first surface 11 as the overall structure.

The first composition may further include a first curing agent. The first curing agent chemically can react with the first urethane-based prepolymer to form an appropriate cross-linked structure to impart appropriate mechanical properties to the polishing constant layer, and can serve to improve lamination compatibility of the polishing constant layer and the polishing variable layer.

In an embodiment, the first curing agent may include a compound including one reactive group selected from the group consisting of an amine group (—NH$_2$), a hydroxyl group (—OH), and combinations thereof. The 'reactive group' refers to a terminal functional group that directly participates in a chemical reaction when the first curing agent reacts with a heterogeneous compound such as the first urethane-based prepolymer. That is, the first curing agent may include, for example, a compound containing an amine group (—NH$_2$) as a reactive group in one molecule, or a compound containing a hydroxyl group (—OH) as a reactive group in one molecule, or a compound containing both an amine group (—NH$_2$) and a hydroxyl group (—OH) as a reactive group in one molecule.

For example, the first curing agent may include one selected from the group consisting of 4,4'-methylenebis(2-chloroaniline) (MOCA), diethyltoluenediamine (DETDA), diaminodiphenylmethane, dimethyl thio-toluene diamine (DMTDA), propanediol bis p-aminobenzoate, methylene bis-methylanthranilate, diaminodiphenylsulfone, m-xylenediamine, isophoronediamine, ethylenediamine, diethylenetriamine, triethylenetetramine, polypropylenediamine, polypropylenetriamine, bis(4-amino-3-chlorophenyl)methane, triethanolamine, tripropanolamine, triisopropanolamine, and combinations thereof.

For example, the first curing agent may include a compound having a hydroxyl group (—OH) as the reactive group. In this regard, the hydroxyl value (Hydroxyl number, OH-Value) of the compound may be greater than about 600 mgKOH/g and about 900 mgKOH/g or less, for example, from about 650 mgKOH/g to about 850 mgKOH/g, or, for example, from about 700 mgKOH/g to about 800 mgKOH/g. When a compound having such hydroxyl value is applied as the first curing agent, it can improve chemical structural linkage when being reacted with the first urethane-based prepolymer derived from the first polyol having a hydroxyl value in the above-described range, and as a result, it may be advantageous in that the overall cured structure imparts improved mechanical properties to the polishing constant layer.

In an embodiment, when the first curing agent includes a compound having a hydroxyl group (—OH) as the reactive group, the molar ratio (NCO:OH) of the isocyanate group (—NCO) present as a free reactive group in the first composition and the hydroxyl group (—OH) derived from the first curing agent may be from about 1:2 to about 2:1, for example, from about 1:1.5 to about 1.5:1, or, for example, from about 1:1.2 to about 1.2:1. By applying the first curing agent so that the molar ratio is satisfied, a cross-linked structure between the first urethane-based prepolymer and the first curing agent may be more advantageous for improving mechanical properties of the polishing constant layer.

The content of the first curing agent in the entire first composition may be from about 15% to about 30% by weight, for example, from about 18% to about 27% by weight, for example, from about 19% to about 26% by weight, or, for example, from about 20% to about 26% by weight. By applying the first curing agent in such amount, a cross-linked structure between the first urethane-based prepolymer and the first curing agent may be more advantageous for improving mechanical properties of the polishing constant layer.

The first composition may further include a first blowing agent as needed. The first blowing agent may serve to adjust density and elasticity by imparting a pore structure to the polishing constant layer. The first blowing agent may include, for example, one selected from the group consisting of a solid phase blowing agent, a gas phase blowing agent, a liquid phase blowing agent, and combinations thereof.

When the first composition further includes the first blowing agent, its content may be from about 0.1 parts by weight to about 10 parts by weight, for example, from about 0.1 parts by weight to about 5 parts by weight, based on 100 parts by weight of the total weight of the first composition.

The polishing variable layer 101 may include a cured product of the second composition including the second urethane-based prepolymer. In the second urethane-based prepolymer, the 'prepolymer' refers to a polymer having a relatively low molecular weight in which the polymerization degree is stopped at an intermediate stage to facilitate molding in the preparing of a cured product. The prepolymer itself undergoes an additional curing process, such as heating, pressurization or/and the like, or may be mixed with another polymerizable compound, for example, an additional compound such as a heterogeneous monomer or a heterogeneous prepolymer, and reacted, and then may be molded into a final cured product.

In an embodiment, the second urethane-based prepolymer may be a reaction product of a second alcohol component including a second polyol having a hydroxyl value (Hydroxyl number, OH-Value) of about 50 mgKOH/g or more and less than about 200 mgKOH/g; and the second isocyanate component. The second alcohol component and the second isocyanate component may include the same compound as the first alcohol component and the first isocyanate component, respectively, or may include different compounds.

In an embodiment, the second isocyanate component may use one selected from the group consisting of aromatic diisocyanate, aliphatic diisocyanate, cycloaliphatic diisocyanate, and combinations thereof. For example, the second isocyanate component may include aromatic diisocyanate. For example, the second isocyanate component may include aromatic diisocyanate and cycloaliphatic diisocyanate.

The second isocyanate component may include, for example, one selected from the group consisting of 2,4-toluenediisocyanate (2,4-TDI), 2,6-toluenediisocyanate (2,6-TDI), naphthalene-1,5-diisocyanate, p-phenylenediisocyanate, tolidinediisocyanate, 4,4'-diphenylmethanediisocyanate, hexamethylenediisocyanate, dicyclohexylmethanediisocyanate, 4,4'-dicyclohexylmethanediisocyanate (H12MDI), isophorone diisocyanate, and combinations thereof.

The second alcohol component may include a second polyol having a hydroxyl value (hydroxyl number, OH-value) of about 50 mgKOH/g or more, and less than 200 mgKOH/g. In the second polyol, the 'polyol' refers to a compound containing at least two or more hydroxyl groups (—OH) per molecule. When the first composition for the polishing constant layer includes a first polyol of a hydroxyl value (hydroxyl number, OH-Value) satisfying the above-mentioned range as the first alcohol component, and at the same time, the second composition for the polishing variable layer includes a second polyol of about 50 mgKOH/g or more and less than about 200 mgKOH/g as the second alcohol component, the characteristics in the thickness direction of the entire polishing layer can be more advantageously realized in terms of securing polishing performance as the physical properties of the polishing variable layer and the polishing constant layer are combined.

The second polyol may have a hydroxyl value of about 50 mgKOH/g or more and less than about 200 mgKOH/g, for example, about 80 mgKOH/g or more and less than about 200 mgKOH/g, for example, about 100 mgKOH/g to about 190 mgKOH/g, for example, about 100 mgKOH/g to about 180 mgKOH/g, for example, about 105 mgKOH/g to about 140 mgKOH/g, or, for example, about 105 mgKOH/g to about 130 mgKOH/g. When a polyol having such hydroxyl value is used as the second polyol together with the polishing constant layer, the physical and/or mechanical properties of the polishing variable layer derived therefrom can be advantageous for the realization of polishing performance.

The second polyol may have a weight average molecular weight (Mw) of about 100 g/mol to about 3,000 g/mol, for example, about 100 g/mol to about 2,000 g/mol, for example, about 100 g/mol to about 1,800 g/mol, or, for example, about 300 g/mol to about 1800 g/mol. As the second polyol has a main chain structure corresponding to this molecular weight, the second alcohol component and the second isocyanate component can react with each other to secure the hardness and elongation rate that are advantageous for improving the polishing performance as a whole.

In an embodiment, the second alcohol component may further include an additional polyol compound in addition to the second polyol.

The additional polyol compound may include, for example, one selected from the group consisting of polyether polyol, polyester polyol, polycarbonate polyol, acryl polyol, and combinations thereof.

Specifically, the additional polyol compound may include one selected from the group consisting of, for example, polypropylene ether glycol, ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol (DEG), dipropylene glycol (DPG), tripropylene glycol, polypropylene glycol, polypropylene triol, and combinations thereof.

In an embodiment, the additional polyol compound in the second alcohol component may have a weight average molecular weight (Mw) of about 100 g/mol or more and less than about 300 g/mol. In this case, the second alcohol component can form an appropriate cross-linked structure in the second urethane-based prepolymer, and as a result, the polishing variable layer 101 can exhibit appropriate tensile strength, elongation rate, and compressive properties, which can be more advantageous for improving polishing performance through the first surface 11.

The second urethane-based prepolymer may have a weight average molecular weight (Mw) of about 500 g/mol to about 3,000 g/mol, for example, about 600 g/mol to about 2,000 g/mol, or, for example, about 800 g/mol to about 1,000 g/mol. When the second urethane-based prepolymer has a degree of polymerization corresponding to the above-mentioned weight average molecular weight (Mw), the polishing variable layer 101 including the final cured product can exhibit appropriate surface hardness and tensile strength, which can be more advantageous for improving polishing performance through the first surface 11.

In an embodiment, the second isocyanate component may include an aromatic diisocyanate. The aromatic diisocyanate may include, for example, 2,4-toluene diisocyanate (2,4-TDI), or may include, for example, 2,4-toluene diisocyanate (2,4-TDI) and 2,6-toluenediisocyanate (2,6-TDI). Additionally, the second polyol compound may include, for example, polytetramethylene ether glycol (PTMG) and diethylene glycol (DEG).

In another embodiment, the second isocyanate component may include aromatic diisocyanate and cycloaliphatic diisocyanate. The aromatic diisocyanate may include, for example, 2,4-toluene diisocyanate (2,4-TDI), or may include, for example, 2,4-toluene diisocyanate (2,4-TDI) and 2,6-toluenediisocyanate (2,6-TDI). The cycloaliphatic diisocyanate may include, for example, 4,4'-dicyclohexylmethane diisocyanate (H12MDI). Additionally, the first polyol compound may include, for example, polytetramethylene ether glycol (PTMG) and diethylene glycol (DEG).

In an embodiment, based on 100 parts by weight of the total weight of the second isocyanate component, the total weight of the second alcohol component may be from about 100 parts by weight to about 180 parts by weight, for example, greater than about 100 parts by weight and up to about 180 parts by weight, for example, from about 110 parts by weight to about 160 parts by weight, or, for example, from about 120 parts by weight to about 150 parts by weight.

In another embodiment, based on 100 parts by weight of the total weight of the second alcohol component, the total weight of the second polyol compound may be greater than about 180 parts by weight and up to about 250 parts by weight, for example, from about 185 parts by weight to about 250 parts by weight, or, for example, from about 190 parts by weight to about 240 parts by weight.

In an embodiment, the second polyol may include polytetramethylene ether glycol (PTMG), and the content of the second polyol may be from about 100 parts by weight to about 250 parts by weight, for example, greater than about 100 parts by weight and up to about 250 parts by weight, for example, from about 110 parts by weight to about 220 parts by weight, or, for example, from about 110 parts by weight to about 140 parts by weight, with respect to 100 parts by weight of the total weight of the second isocyanate component.

In another embodiment, the second polyol may include polytetramethylene ether glycol (PTMG), and the content of the second polyol may be from about 150 parts by weight to about 250 parts by weight, for example, from about 180 parts by weight to about 230 parts by weight, with respect to 100 parts by weight of the total weight of the second isocyanate component.

In an embodiment, the additional polyol compound of the second alcohol component may include diethylene glycol (DEG), and the content of the diethylene glycol (DEG) may be from about 1 part by weight to about 20 parts by weight, for example, from about 1 part by weight to about 15 parts by weight, with respect to 100 parts by weight of the total weight of the second isocyanate component.

In an embodiment, the second isocyanate component may include the aromatic diisocyanate, and the aromatic diisocyanate may include 2,4-TDI and 2,6-TDI, and the content of 2,6-TDI may be from about 1 part by weight to about 40 parts by weight, for example, from about 1 part by weight to about 30 parts by weight, for example, from about 3 parts by weight to about 28 parts by weight, or, for example, about 20 parts by weight to about 30 parts by weight, with respect to 100 parts by weight of the 2,4-TDI.

In another embodiment, the content of 2,6-TDI may be from about 1 part by weight to about 40 parts by weight, for example, from about 1 part by weight to about 30 parts by weight, for example, from about 1 part by weight to about 20 parts by weight, or, for example, about 1 part by weight to about 10 parts by weight, with respect to 100 parts by weight of the 2,4-TDI.

In an embodiment, the second isocyanate component may include the aromatic diisocyanate and the cycloaliphatic diisocyanate, and the content of the cycloaliphatic diisocyanate may be from about 5 parts by weight to about 30 parts by weight, for example, about 10 parts by weight to about 25 parts by weight, with respect to total 100 parts by weight of the aromatic diisocyanate.

When the second urethane-based prepolymer satisfies the above-described compositional characteristics, physical/mechanical properties for realizing the desired variability of the polishing variable layer can be secured. Additionally, improved processability can be secured in forming additional components such as a groove on the first surface of the polishing variable layer. Further, in terms of the overall structure of the polishing layer laminated with the polishing constant layer, it can be more advantageous for subdividing the physical properties in the thickness direction and, at the same time, securing uniformity optimized for the realization of the polishing performance.

The second composition has an isocyanate group content (NCO %) of about 5% to about 11% by weight, for example, about 5% to about 10% by weight, for example, about 5% to about 9.5% by weight, or, for example, about 8.0% to about 9.5% by weight. The 'isocyanate group content' refers to a percentage of the weight of isocyanate groups (—NCO) present as free reactive groups without urethane reaction in the total weight of the second composition. The NCO % of the second composition may be calculated based on the total weight of the second composition excluding the second curing agent and the second blowing agent to be described later. The isocyanate group content (NCO %) of the second composition may be designed by synthetically adjusting the kind and content of the monomer for preparing the second urethane-based prepolymer, process conditions such as temperature and pressure of the second urethane-based prepolymer preparing process, and the kind of additive used for preparing the second urethane-based prepolymer. When the isocyanate group content satisfies the aforementioned range, it can be advantageous for the polishing variable layer 101 prepared through the curing of the second composition to secure appropriate physical/mechanical characteristics, and when the polishing variable layer is applied in a laminated state with the polishing constant layer 102, it can be advantageous for imparting excellent polishing performance through the first surface 11 to the polishing object.

In an embodiment, the content of isocyanate group (—NCO) in the first composition may be greater than the content of isocyanate group (—NCO) in the second composition. That is, while the NCO % of the first composition and the NCO % of the second composition each satisfy the above-described ranges, at the same time, the content of isocyanate groups (—NCO) in the first composition may be greater than the content of isocyanate groups (—NCO) in the second composition. For example, the ratio of the % NCO of the first composition to the % NCO of the second composition is from about 1:0.6 to about 1:0.9, for example, from about 1:0.65 to about 1:0.85, or, for example, from about 1:0.70 to about 1:0.80. When each NCO % of the first composition and the second composition satisfies such magnitude relationship, physical properties due to the laminated structure of the polishing constant layer and the polishing variable layer may be advantageous for optimizing polishing performance of the polishing pad.

The second composition may further include a second curing agent and a second blowing agent. The second curing agent and the second blowing agent may include the same compounds as the first curing agent and the first blowing agent, respectively, or may include different compounds.

In an embodiment, the second curing agent may include a compound including one reactive group selected from the group consisting of an amine group (—NH$_2$), an alcohol group (—OH), and combinations thereof. The 'reactive group' refers to a terminal functional group that directly participates in a chemical reaction when the second curing agent reacts with a heterogeneous compound such as the second urethane-based prepolymer. That is, the second curing agent may include, for example, a compound containing only an amine group (—NH$_2$) as a reactive group in one molecule, or a compound containing only an alcohol group (—OH) as a reactive group in one molecule, or a compound containing an amine group (—NH$_2$) and an alcohol group (—OH) as a reactive group in one molecule.

For example, the second curing agent may include one selected from the group consisting of 4,4'-methylenebis(2-chloroaniline) (MOCA), diethyltoluenediamine (DETDA), diaminodiphenylmethane, dimethyl thio-toluene diamine (DMTDA), propanediol bis p-aminobenzoate, methylene bis-methylanthranilate, diaminodiphenylsulfone, m-xylylenediamine, isophoronediamine, ethylenediamine, diethylenetriamine, triethylenetetramine, polypropylenediamine, polypropylenetriamine, bis(4-amino-3-chlorophenyl)methane, triethanolamine, tripropanolamine, triisopropanolamine, and combinations thereof.

In an embodiment, the first curing agent may include a compound containing an alcohol group as a reactive group in one molecule, and the second curing agent may include a compound containing an amine group as a reactive group in one molecule. By applying each of the first curing agent and the second curing agent in this way, excellent interface physical properties of the polishing variable layer and the polishing constant layer can be secured, and the overall physical properties of the polishing layer, which is a laminated structure thereof, can be more advantageous for optimizing the polishing performance, the eco-friendly effects can be obtained.

The content of the second curing agent in the entire second composition may be from about 15% to about 30% by weight, for example, from about 18% to about 27% by weight, for example, from about 19% to about 26% by weight, or, for example, from about 20% to about 26% by weight. By applying the second curing agent in such content, the polishing variable layer including the cured product of the second composition can be advantageous for securing mechanical properties suitable for polishing and appropriate variability.

The molar ratio (NCO:reactive groups) of isocyanate groups (—NCO) in the second composition to reactive groups of the second curing agent may be from about 1:0.80 to about 1:1.20, for example, from about 1:0.90 to about 1:1.10, for example, from about 1:0.90 to about 1:1.00, or, for example, about 1:0.90 or more and less than about 1:1.00. For example, when the second curing agent includes a compound containing an amine group as a reactive group in one molecule, the molar ratio (NCO:NH$_2$) of the isocyanate group (—NCO) in the second composition to the amine group of the second curing agent can satisfy the aforementioned range. When the molar ratio satisfies the above-described range, an appropriate cross-linked structure can be formed by the chemical reaction of the second urethane-based prepolymer and the second curing agent, and as a result, the polishing variable layer can secure physical/mechanical properties such as tensile strength and elongation rate at an appropriate level to be advantageous for transferring excellent polishing performance to the polished surface of the polishing object through the first surface.

The polishing variable layer 101 may be of a porous structure including a plurality of pores 15. The plurality of pores 15 located on the uppermost surface of the polishing variable layer 101 may expose at least a portion of their interiors to the outside to impart a predetermined surface roughness to the first surface 11. FIG. 2 schematically shows a structural change of the first surface 11 according to an embodiment during a polishing process. Specifically, FIG. 2 is a schematic view schematically showing that a portion of the plurality of pores 15 according to an embodiment, which expose their interiors to the outside of the polishing surface 11, are subjected to the structural change during a polishing process. Referring to FIG. 2, since the plurality of pores 15 are distributed across the polishing variable layer 101, they can continuously contribute to the formation of the surface roughness even if the top surface is gradually cut during the polishing process with the first surface 11. However, as for the pores 15 whose interiors are exposed to the first surface 11, as the polishing process continues to be performed under a predetermined pressure condition, the portion corresponding to the boundary between the first surface 11 and the pore 15 is physically pressed by the pressure to be deformed in shape, and such phenomenon affects the change in the surface roughness of the first surface 11. In this case, as the polishing layer includes a laminated structure of the polishing variable layer 101 and the polishing constant layer 102, the physical properties in the thickness direction can be appropriately designed, so that it can be advantageous for the first surface 1I to maintain a surface state suitable for polishing for a longer period of time.

In an embodiment, the plurality of pores 15 included in the polishing variable layer 101 have an average size of about 5 µm to about 50 µm, for example, about 5 µm to about 40 µm, for example, from about 10 µm to about 40 µm, or, for example, from about 10 µm to about 35 µm. When the plurality of pores satisfy the above-mentioned size, it may be advantageous for the first polishing variability index according to Equation 1 below to satisfy the corresponding range, and accordingly, it can be more advantageous in terms of realization of the target polishing performance itself and uniform performance throughout the lifespan of the polishing variable layer. The average size of the plurality of pores 15 is a two-dimensional value, and based on the number average value of the pore diameters measured on the projection image taken by photographing the size of the pores exposed to the outside of one surface with an imaging means, such as a scanning electron microscope (SEM), a transmission electron microscope (TEM) or the like, based on the lifespan introduction time of the polishing variable layer 101.

The second composition may include a second blowing agent. The second blowing agent may include one selected from the group consisting of a solid phase blowing agent, a gas phase blowing agent, a liquid phase blowing agent, and combinations thereof, as a component for forming the pore structure in the polishing variable layer 101. In an embodiment, the second blowing agent may include a solid phase blowing agent, a gas phase blowing agent, or combinations thereof.

The solid phase blowing agent may include expandable particles. The expandable particles may be particles characterized by being capable of expand by heat or pressure, and the final pore size may be determined by heat, pressure or the like applied in the process of preparing the polishing variable layer 101. The expandable particles may include thermally expanded particles, unexpanded particles, or combinations thereof. The 'thermally expanded' particles are particles pre-expanded by heat, and refer to particles having little or no size change due to heat or pressure applied during the preparing process of the polishing variable layer. The 'unexpanded' particles are particles that are not pre-expanded, and refer to particles whose final sizes are determined by the expansion caused by heat or pressure applied during the preparing process of the polishing layer.

The average particle diameter of the expandable particles may be from about 5 µm to about 200 µm, for example, from about 20 µm to about 50 µm, for example, from about 21 µm to about 50 µm, or, for example, from about 21 µm to about 40 µm. The average particle diameter of the expandable particles may refer to the average particle diameter of the thermally expanded particles themselves in the case of the thermally expanded particles, and refer to the average particle diameter of the particles after being expanded by heat or pressure in the case of the unexpanded particles.

The expandable particles may include an outer shell made of a resin material, and an expansion-inducing component present in the inside sealed by the outer shell.

For example, the outer shell may include a thermoplastic resin, and the thermoplastic resin may be one or more kinds selected from the group consisting of vinylidene chloride-based copolymer, acrylonitrile-based copolymer, methacrylonitrile-based copolymer, and acrylic copolymer.

The expansion-inducing component may include one selected from the group consisting of hydrocarbon compounds, chlorofluoro compounds, tetraalkylsilane compounds, and combinations thereof.

Specifically, the hydrocarbon compound may include one selected from the group consisting of ethane, ethylene, propane, propene, n-butane, isobutene, n-butene, isobutene, n-pentane, isopentane, neopentane, n-hexane, heptane, petroleum ether, and combinations thereof.

The chlorofluoro compound may include one selected from the group consisting of trichlorofluoromethane (CC13F), dichlorodifluoromethane (CC12F2), chlorotrifluoromethane (CClF3), tetrafluoroethylene (CClF2-CClF2), and combinations thereof.

The tetraalkylsilane compound may include one selected from the group consisting of tetramethylsilane, trimethylethylsilane, trimethylisopropylsilane, trimethyl-n-propylsilane, and combinations thereof.

The solid phase blowing agent may optionally include particles treated with an inorganic component. For example, the solid phase blowing agent may include expandable particles treated with an inorganic component. In an embodiment, the solid phase blowing agent may include expandable particles treated with silica (SiO2) particles. The inorganic component treatment of the solid phase blowing agent can prevent aggregation between a plurality of particles. The chemical, electrical, and/or physical characteristics of the surface of the inorganic component-treated solid phase blowing agent may differ from those of a solid phase blowing agent not treated with the inorganic component.

For example, the second blowing agent includes a solid phase blowing agent, and the solid phase blowing agent may be used in an amount of about 0.5 parts by weight to about 10 parts by weight, for example, about 1 part by weight to about 3 parts by weight, for example, about 1.3 parts by weight to about 2.7 parts by weight, or, for example, about 1.3 parts by weight to about 2.6 parts by weight, based on 100 parts by weight of the urethane-based prepolymer.

The gas phase blowing agent may include an inert gas. The gas phase blowing agent may be used as a pore-forming element by being added during a reaction between the second urethane-based prepolymer and the second curing agent.

Although the kind of the inert gas is not particularly limited as long as it does not participate in the reaction between the second urethane-based prepolymer and the second curing agent, the inert gas may include, for example, one selected from the group consisting of nitrogen gas (N2), argon gas (Ar), helium gas (He), and combinations thereof. Specifically, the inert gas may include nitrogen gas (N2) or argon gas (Ar).

In an embodiment, the second blowing agent may consist of a solid phase blowing agent only.

In an embodiment, the solid phase blowing agent may include expandable particles, and the expandable particles may include the thermally expanded particles. For example, the expandable particles may consist of the thermally expanded particles only. When the expandable particles do not include the unexpanded particles but consist of the thermally expanded particles only, the variability of the pore structure may be somewhat reduced, but the predictability can be increased, so it can be advantageous for implementing uniform pore characteristics across the entire region of the polishing variable layer.

In an embodiment, the thermally expanded particles may be particles having an average particle diameter of about 5 µm to about 200 µm. The average particle diameter of the thermally expanded particles may be from about 5 µm to about 100 µm, for example, from about 10 µm to about 80 µm, for example, from about 20 µm to about 70 µm, for example, from about 20 µm to about 50 µm, for example, from about 30 µm to about 70 µm, for example, from about 25 µm to 45 µm, for example, from about 40 µm to about 70 µm, or, for example, from about 40 µm to about 60 µm. The average particle diameter may be defined as the D50 of the thermally expanded particles.

In an embodiment, the density of the thermally expanded particles may be from about 30 kg/m3 to about 80 kg/m3, for example, from about 35 kg/m3 to about 80 kg/m3, for example, from about 35 kg/m3 to about 75 kg/m3, for example, from about 38 kg/m3 to about 72 kg/m3, for example, from about 40 kg/m3 to about 75 kg/m3, or, for example, from about 40 kg/m3 to about 72 kg/m3.

In another embodiment, the second blowing agent may include a solid phase blowing agent and a gas phase blowing agent. Descriptions regarding the solid phase blowing agent are the same as described above.

The second blowing agent may include the solid phase blowing agent and the gas phase blowing agent, and the gas phase blowing agent may include nitrogen gas.

The gas phase blowing agent may be injected through a predetermined injection line during the process of mixing the solid phase blowing agent and the second curing agent with the urethane-based prepolymer. The injection rate of the gas phase blowing agent may be from about 0.8 L/min to about 2.0 L/min, for example, from about 0.8 L/min to about 1.8 L/min, for example, from about 0.8 L/min to about 1.7 L/min, for example, from about 1.0 L/min to about 2.0 L/min, for example, from about 1.0 L/min to about 1.8 L/min, or, for example, from about 1.0 L/min to about 1.7 L/min.

The second composition for preparing the polishing variable layer may further include other additive, such as a surfactant, a reaction rate controlling agent, or the like. The names such as 'surfactant' and 'reaction rate controlling agent' are arbitrary names called on the basis of the main role of the corresponding substance, and each corresponding substance does not necessarily perform only a function limited to the role by the corresponding name.

The surfactant is not particularly limited as long as it is a substance serving to prevent aggregation or overlapping of pores. For example, the surfactant may include a silicone-based polymer.

When the second composition includes the surfactant, the surfactant may be included in a content of about 0.2 parts by weight to about 2 parts by weight, for example, about 0.2 parts by weight to about 1.9 parts by weight, for example, about 0.2 parts by weight to about 1.8 parts by weight, for example, about 0.2 parts by weight to about 1.7 parts by weight, for example, about 0.2 parts by weight to about 1.6 parts by weight, for example, about 0.2 parts by weight to about 1.5 parts by weight, or, for example, about 0.5 parts by weight to 1.5 parts by weight, with respect to 100 parts by weight of the second urethane-based prepolymer. When the surfactant is used in a content of the above range, it may be advantageous for the pores derived from the gas phase blowing agent to be stably formed and maintained in the curing mold.

The reaction rate controlling agent may serve to promote or retard the reaction, and a reaction accelerator, a reaction retarder, or both may be used depending on the purpose.

The reaction rate controlling agent may include a reaction accelerator. For example, the reaction accelerator may include one selected from the group consisting of tertiary amine-based compounds, organometallic compounds, and combinations thereof.

Specifically, the reaction rate controlling agent may include one selected from the group consisting of triethylenediamine, dimethylethanolamine, tetramethylbutanediamine, 2-methyl-triethylenediamine, dimethylcyclohexylamine, triethylamine, triisopropanolamine, 1,4-diazabicyclo(2,2,2)octane, bis(2-methylaminoethyl)ether, trimethylaminoethylethanolamine, N,N,N,N,N"-pentamethyldiethylenetriamine, dimethylaminoethylamine, dimethylaminopropylamine, benzyldimethylamine, N-ethylmorpholine, N,N-dimethylaminoethylmorpholine, N,N-dimethylcyclohexylamine, 2-methyl-2-azanovonein, dibutyltin dilaurate, stannous octoate, dibutyltin diacetate, dioctyltin diacetate, dibutyltin maleate, dibutyltin di-2-ethylhexanoate, dibutyltin dimercaptide, and combinations thereof. In an embodiment, the reaction rate controlling agent may include one selected from the group consisting of benzyldimethylamine, N,N-dimethylcyclohexylamine, triethylamine, and combinations thereof.

When the second composition includes the reaction rate controlling agent, the reaction rate controlling agent may be included in an amount of about 0.05 parts by weight to about 2 parts by weight, for example, about 0.05 parts by weight to about 1.8 parts by weight, for example, about 0.05 parts by weight to about 1.7 parts by weight, for example, about 0.05 parts by weight to about 1.6 parts by weight, for example, about 0.1 parts by weight to about 1.5 parts by weight, for example, about 0.1 parts by weight to about 0.3 parts by weight, for example, about 0.2 parts by weight to about 1.8 parts by weight, for example, about 0.2 parts by weight to about 1.7 parts by weight, for example, about 0.2 parts by weight to about 1.6 parts by weight, for example, from about 0.2 parts by weight to about 1.5 parts by weight, or, for example, about 0.5 parts by weight to about 1 part by weight, with respect to 100 parts by weight of the second urethane-based prepolymer. When the reaction rate controlling agent is used in a content within the aforementioned range, it can be advantageous for controlling the curing reaction rate of the second composition, so that the polishing variable layer has pores of a desired size and hardness of a desired magnitude.

When the components of each of the polishing variable layer and the polishing constant layer, and the contents thereof satisfy the above-mentioned conditions, the polishing layer to which the laminated structure of them is applied can realize precisely designed physical properties across the thickness direction. As a result, it is possible to obtain effects that enable mechanical properties such as elasticity and rigidity, which the polishing layer transfers to the polished surface of the polishing object through the first surface, to be optimized in terms of polishing performance such as polishing rate, flatness, defect prevention, and the like.

In an embodiment, the polishing variable layer may have a first polishing variability index of about 0.1 to about 11.0 according to Equation 1 below.

$$\frac{(Ri - Rf) \cdot Ti}{(Ti - Tf) \cdot Ri} \qquad \text{[Equation 1]}$$

In Equation 1 above, Ri is the surface roughness (Ra) of the first surface at the lifespan introduction time of the polishing variable layer, Rf is the surface roughness (Ra) of the first surface at the lifespan end time of the polishing variable layer, Ti is the total thickness of the polishing pad at the lifespan introduction time of the polishing variable layer, and Tf is the total thickness of the polishing pad at the lifespan end time of the polishing variable layer.

As described above, the polishing variable layer 101 is a region whose physical and/or chemical properties change during a polishing process to which the polishing pad is applied, and has a predetermined lifespan in terms of providing a desired level of polishing performance. The lifespan introduction time of the polishing variable layer 101 refers to an arbitrary time point between after the polishing variable layer or the polishing pad is manufactured and before it is applied to a process. Additionally, the lifespan end time of the polishing variable layer 101 refers to a time point when the polishing variable layer 101 no longer realizes the polishing performance, and thus the polishing variable layer or the entire polishing pad needs to be replaced. For example, the lifespan end time may be defined as a time point when the polishing rate of the polished surface of the polishing object changes by 20% compared to the initial polishing rate within 1 hour after starting polishing. That is, the initial polishing rate is a polishing rate value measured within 1 hour after starting polishing on the polished surface, and the lifespan end time may be defined as a time point when the polishing rate for the polished surface is increased by 20% or decreased by 20% compared to the initial polishing rate.

The first polishing variability index has surface roughnesses (Ri, Rf) and the total thicknesses (Ti, Tf) of the polishing pad 110 of each of the lifespan introduction time and the lifespan end time of the polishing variable layer 101 as components. The first polishing variability index according to Equation 1 may serve as an index indicating the variable performance of the polishing variable layer 101. That is, when the value of Equation 1 of the polishing variable layer represents the above-mentioned range, that is, the range of about 0.1 to about 11.0, the polishing variable layer has a corresponding variability, so that when being applied as a part of the polishing layer 10, it can continuously and uniformly exhibit structural characteristics optimized for polishing efficiency over its lifespan.

In an embodiment, the first polishing variability index may be from about 0.1 to 11.0, for example, from about 0.1 to about 9.0, for example, from about 0.2 to about 9.0, for example, from about 0.2 to about 8.5, for example, from about 0.2 to about 8.0, for example, from about 0.2 to about 7.5, for example, from about 0.5 to about 7.5, for example, from about 0.8 to about 7.5, for example, from about 0.9 to about 7.5, for example, from about 1.0 to about 6.0, or, for example, from about 2.0 to about 3.5.

Ti may be, for example, from about 800 µm to about 5000 µm, for example, from about 1000 µm to about 4000 µm, for example, from about 1000 µm to 3000 µm, for example, from about 1500 µm to about 3000 µm, for example, from about 1700 µm to about 2700 µm, or, for example, from about 2000 µm to about 3500 µm, but is not limited thereto.

Ri may be, for example, from about 5 µm to about 15 µm, for example, from about 5 µm to about 12 µm, or, for example, from about 5 µm to 10 µm, but is not limited thereto.

In an embodiment, when Ti and Ri each satisfy the above-mentioned ranges, and at the same time, the first polishing variability index satisfies the above-mentioned range, it may be more advantageous in terms of realizing excellent polishing performance resulting from the structural characteristics of the polishing variable layer 101.

In an embodiment, the polishing variable layer 101 may include at least one groove 14 on the first surface 11, the groove having a depth d1 smaller than or equal to the total thickness D1 of the polishing variable layer 101. The groove 14 can play a role in appropriately realizing physical polishing characteristics by adjusting the fluidity of the polishing liquid or polishing slurry supplied to the first surface 11 during the polishing process using the polishing pad, or by adjusting the size of the area in which the first surface 11 and the polished surface of a polishing object are in direct contact with each other.

For example, the polishing pad 110 may include a plurality of grooves 14 in the first surface 11. In an embodiment, the planar shape of the polishing pad 110 may be substantially circular, and the plurality of grooves 14 may have a concentric circular structure in which they are spaced apart at a predetermined distance from the center on the planar surface of the polishing pad 110 toward the edge. In another embodiment, the plurality of grooves 14 may have a radial structure in which they are continuously formed from the center on the planar surface of the polishing pad 110 toward the edge. In still another embodiment, the plurality of grooves 14 may include concentric circular grooves and radial grooves at the same time.

In the polishing variable layer 101 which is a region from the first surface 11 to the separable interface 13, when the first surface 11 includes at least one groove 14, the second polishing variability index according to Equation 2 below of the polishing variable layer 101 may be from about 0.1 to about 3.5.

$$\frac{(Ri - Rf) \cdot Gi}{(Gi - Gf) \cdot Ri} \qquad \text{[Equation 2]}$$

In Equation 2 above, Ri is the surface roughness (Ra) of the first surface at the lifespan introduction time of the polishing variable layer, Rf is the surface roughness (Ra) of the first surface at the lifespan end time of the polishing variable layer, Gi is the depth of the groove at the lifespan introduction time of the polishing variable layer, and Gf is the depth of the groove at the lifespan end time of the polishing variable layer.

The description of the lifespan introduction time and the lifespan end time of the polishing variable layer 101 is the same as described above with respect to the first polishing variability index according to Equation 1 above. When the second polishing variability index of the polishing variable layer 101 satisfies the above-mentioned range, the polishing variable layer 101 can provide a structure optimized in terms of fluidity of the polishing liquid or polishing slurry, and a direct contact area on the first surface provided with respect to the polished surface can be secured at an appropriate level, which may be more advantageous for securing a polishing rate within a target range.

In an embodiment, the second polishing variability index may be from about 0.1 to about 3.5, for example, from about 0.1 to about 3.3, for example, from about 0.1 to about 3.0, for example, from about 0.1 to about 2.0, for example, from about 0.3 to about 1.8, for example, from about 0.5 to about 1.5, for example, from about 0.5 to about 1.2, or, for example, from about 0.5 to 1.0.

The Gi may be, for example, from about 600 μm to about 900 μm for example, from about 650 μm to about 900 μm, or, for example, from about 700 μm to about 900 μm, but is not limited thereto.

In an embodiment, when Ri and Gi each satisfy the above-mentioned ranges, and at the same time, the second polishing variability index satisfies the above-mentioned range, it may be more advantageous in terms of realizing the polishing performance by the structural characteristics of the polishing variable layer 101.

In an embodiment, in the polishing variable layer 101, each of the first polishing variability index and the second polishing variability index may simultaneously satisfy the aforementioned ranges. When the first polishing variability index and the second polishing variability index each satisfy the above-described ranges, the polishing variable layer 101 as a part of the polishing layer 10 can have structural characteristics optimized for polishing efficiency, and particularly, the polishing variable layer 101 can provide a structure optimized in terms of fluidity of the polishing liquid or polishing slurry, and a direct contact area on the first surface provided with respect to the polished surface can be secured at an appropriate level, which may be more advantageous for securing a polishing rate within a target range. Furthermore, it may be more advantageous for realizing a consistent polishing performance so that the aforementioned benefits are maintained throughout its lifespan.

When the first surface 11 includes at least one groove 14 having a depth equal to or smaller than the total thickness of the polishing variable layer 101, the rate of change (%) of the depth of the groove 14 in the polishing variable layer 101 according to Equation 3 below may be from about 20% to about 100%.

$$\frac{(Gi - Gf)}{Gi} \times 100 \qquad \text{[Equation 3]}$$

In Equation 3 above, Gi represents the groove depth at the lifespan introduction time of the polishing variable layer 101, and Gf represents the groove depth at the lifespan end time of the polishing variable layer 101.

The descriptions regarding the lifespan introduction time and lifespan end point of the polishing variable layer 101, Gi, and Gf are all the same as those described above with respect to the second polishing variability index.

In an embodiment, the rate of change of groove depth according to Equation 3 above may be from about 20% to about 80%, for example, from about 30% to 80%, for example, from about 40% to about 80%, for example, from about 40% to about 70%, or, for example, from about 50% to about 70%.

Referring to FIG. 1, the depth d1 of the groove 14 is changed from the depth Gi at the lifespan introduction time to the depth Gf at the lifespan end time during the polishing process. Specifically, as the first surface 11 and the polished surface of a polishing object are polished by physical contact with each other, thereby cutting the first surface 11, the depth d1 of the groove 14 gradually becomes shallower. In this regard, the value of Equation 3 above employing the depth Gi of the groove at the lifespan introduction time and the depth of the groove Gf at the lifespan end time as factors can satisfy the above-mentioned range when physical characteristics such as the elongation, tensile strength, hardness and the like of the polishing variable layer 101 are properly supported. Specifically, if the physical properties of the polishing variable layer 101 are not properly supported, the influence on the polishing performance induced by a change in the fluidity of the polishing slurry or the like increases with the more shallow depth d1 of the groove, and so there is a concern regarding the occurrence of the abrupt deterioration of the overall polishing performance. When the value of Equation 3 above satisfies the above-mentioned range, the polishing variable layer 101 according to an embodiment can exhibit the optimum physical properties corresponding thereto, based on which, even if the depth d1 of the groove becomes shallow, the influence on the polishing performance can be minimized to realize excellent polishing performance throughout the polishing process. Additionally, as the usage period of the polishing variable layer 101 is maximized, an effect of extending the lifespan of the polishing pad can be obtained.

Referring to FIG. 1, the width w1 of the groove 14 may affect the size of a physical contact area between the first surface 11 and the polished surface of a polishing object during the polishing process. Accordingly, the required polishing performance can be realized by appropriately designing the width w1 of the groove 14 according to the type of the polishing object, the type of the polishing liquid or the polishing slurry, the target polishing performance, and the like. For example, the width w1 of the groove 14 may be from about 0.2 mm to about 1.0 mm, for example, from about 0.3 mm to about 0.8 mm, for example, from about 0.4 mm to about 0.7 mm, or, for example, from about 0.4 mm to about 0.6 mm.

When the polishing variable layer 101 includes a plurality of grooves 14 on the first surface 11, the pitch p1 of the groove 14, which is defined as the spacing between two adjacent grooves 14, can also be appropriately designed under the same context as the width w1 of the groove 14, thereby contributing to the realization of the required polishing performance. For example, the pitch p1 of the grooves 14 may be from about 1.5 mm to about 5.0 mm, for example, from about 1.5 mm to about 4.0 mm, or, for example, from about 1.5 mm to about 3.0 mm.

Although the numerical value ranges of the width w1 and the pitch p1 of the grooves is a structural configuration which substantially does not change during the polishing process, for example, each of the ranges may be a value measured based on the lifespan introduction time of the polishing variable layer 101.

When he polishing variable layer 101 satisfies at least one of the first polishing variability index, the second polishing variability index, and the third polishing variability index, and the polishing constant layer 102 is composed of the above-described composition, the polishing layer 10 to which the laminated structures is applied can be advantageous for securing desired polishing performance concurrently in terms of polishing rate, polishing flatness, and defect prevention.

FIG. 3 schematically shows a cross-section of the polishing pad 110 according to an embodiment. Referring to FIG. 3, the polishing pad 110 may further include a cushion layer 20 on one surface of the polishing layer 10. In this case, the second surface 12 of the polishing layer 10 may serve as an attachment surface for the cushion layer 20.

The cushion layer 20 may impart shock absorption capability to the polishing pad 110. When considering a method for preparing a semiconductor device to be described later, the polishing process proceeds while bringing the polished surface of the semiconductor substrate as the polishing object into direct or indirect contact with the first surface 11 as the polishing surface, and at this time, a predetermined pressing condition may be applied according to the polishing purpose. The cushion layer 20 can provide an appropriate elastic force in the thickness direction of the polishing pad 110 to minimize the occurrence of defects such as scratches on the polished surface during the polishing process performed under such pressing conditions, and can contribute to greatly improving the polishing flatness of the polished surface.

The cushion layer 20 may include a non-woven fabric or suede, but is not limited thereto.

In an embodiment, the cushion layer 20 may include a non-woven fabric. The 'non-woven fabric' refers to a three-dimensional network structure of non-woven fibers. Specifically, the cushion layer 20 may include a nonwoven fabric and a resin impregnated in the non-woven fabric.

The non-woven fabric may be, for example, a non-woven fabric of fibers including one selected from the group consisting of polyester fibers, polyamide fibers, polypropylene fibers, polyethylene fibers, and combinations thereof.

The resin impregnated into the non-woven fabric may include, for example, one selected from the group consisting of a polyurethane resin, a polybutadiene resin, a styrene-butadiene copolymer resin, a styrene-butadiene-styrene copolymer resin, an acrylonitrile-butadiene copolymer resin, a styrene-ethylene-butadiene-styrene copolymer resin, a silicone rubber resin, a polyester-based elastomer resin, a polyamide-based elastomer resin, and combinations thereof.

In an embodiment, the cushion layer 20 may include a non-woven fabric of fibers including polyester fibers impregnated with a resin including a polyurethane resin. By applying, as the cushion layer 20, a non-woven material and a resin of this kind material, a lamination combination with the polishing layer 10 to which the polishing variable layer 101 and the polishing constant layer 102 are applied can be more advantageous for realizing the desired polishing performance.

In an embodiment, the cushion layer 20 may have a thickness of about 0.5 mm to about 2.5 mm, for example, about 0.8 mm to about 2.5 mm, for example, about 1.0 mm to about 2.5 mm, for example, from about 1.0 mm to about 2.0 mm, or, for example, from about 1.2 mm to about 1.8 mm.

Referring to FIG. 3, the polishing pad 110 according to an embodiment may further include a first adhesive layer 30 for attaching the polishing layer 10 and the cushion layer 20. The first adhesive layer 30 may include, for example, a heat-melt adhesive. Specifically, the first adhesive layer 30 may include one selected from the group consisting of a urethane-based adhesive, a silicone-based adhesive, an acrylic adhesive, and combinations thereof, but is not limited thereto.

Referring to FIG. 3, the polishing pad 110 may further include a second adhesive layer 40 for attaching a surface plate. The second adhesive layer 40 may be a media layer for attaching the polishing pad 110 and the surface plate of a polishing apparatus, and may be derived from, for example, a pressure-sensitive adhesive (PSA), but is not limited thereto.

In an embodiment, the compressibility of the polishing pad 110 is from about 0.3% to about 1.8%, for example, from about 0.3% to 1.6%, for example, from 0.3% to 1.4%, for example, from about 0.5%, to 1.4%, for example, from about 0.7% to about 1.4%, or, for example, greater than about 0.9% and up to about 1.2%. As described above, the polishing pad 110 can realize a compressibility within the above range through a subdivided structural design in the thickness direction, and by transferring a corresponding elastic force to the polished surface through the first surface 11, it is possible to obtain the advantage of maximizing the defect prevention performance.

Hereinafter, a method for preparing the polishing pad 110 will be described.

The polishing pad 110 may be prepared by a preparing method including preparing a polishing layer 10 including a first surface 1I which is a polishing surface, a second surface 12 which is a rear surface opposite to the first surface 11, and at least one separable interface 13 between the first surface 11 and the second surface 12, wherein the preparing of the polishing layer 10 includes: preparing at least one polishing variable layer 101 that is a region from the first surface 11 to the separable interface 13; preparing at least one polishing constant layer 102 that is a region from the separable interface 13 to the second surface 12; and laminating the polishing variable layer 101 and the polishing constant layer 102 using the separable interface 13 as a lamination interface, and wherein the preparing of the polishing constant layer 102 includes preparing a first urethane-based prepolymer by reacting a first alcohol component including a first polyol having a hydroxyl value (hydroxyl number, OH-Value) of 200 mgKOH/g to 900 mgKOH/g with the first isocyanate component; and curing the first composition including the first urethane-based prepolymer.

Putting it differently, the polishing pad 110 may be prepared by a preparing method including preparing a polishing layer 10 including a first surface 11 which is a polishing surface, a second surface 12 which is a rear surface opposite to the first surface 11, and at least one separable interface 13 between the first surface 11 and the second surface 12, wherein the preparing of the polishing layer 10 includes: preparing at least one polishing variable layer 101 that is a region from the first surface 11 to the separable interface 13; preparing at least one polishing constant layer 102 that is a region from the separable interface 13 to the second surface 12; and laminating the polishing variable layer 101 and the polishing constant layer 102 using the separable interface 13 as a lamination interface, and wherein the preparing of the polishing constant layer 102 includes preparing a first urethane-based prepolymer by reacting a first alcohol component including a first polyol having a hydroxyl value (hydroxyl number. OH-Value) of 200 mgKOH/g to 900 mgKOH/g with the first isocyanate component; and curing the first composition including the first urethane-based prepolymer.

Descriptions regarding each of the polishing variable layer 101, the polishing constant layer 102, and the separable interface 13 are all the same as described above regarding the polishing pad 110. Additionally, with respect to each matter related to the first polyol, the first alcohol component, the first isocyanate component, the first urethane-based prepolymer, and the first composition, all of the matters and technical advantages described above for them regarding the polishing pad 110 may be integrally applied to the method for preparing a polishing pad.

The laminating of the polishing variable layer 101 and the polishing constant layer 102 may be laminating with a double-sided adhesive. The double-sided adhesive is not particularly limited as long as it is capable of mutual adhesion, but may include, for example, one selected from the group consisting of an acrylic adhesive, urethane adhesive, and combinations thereof. Accordingly, the lamination interface of the polishing variable layer 101 and the polishing constant layer 102 may serve as the separable interface 13.

In an embodiment, the preparing of the polishing constant layer 102 may further include preparing the first polyol from waste of the polishing pad. The first polyol is not particularly limited as long as it satisfies the above-mentioned hydroxyl value range, and nevertheless, for example, because it is derived from waste used for the same purpose when it is derived from the waste of the polishing pad, it can be easier to realize physical properties that meet the technical purpose, and it can also be possible to implement an eco-friendly technology. As described above, the 'polishing pad waste' may refer to a polishing pad discarded after being used in a polishing process, or a by-product thrown away in the process of preparing the polishing pad.

For example, the preparing of the first polyol from the waste of the polishing pad may include pulverizing the waste of the polishing pad to obtain a pulverized product; and hydrolyzing the pulverized product to obtain the first polyol.

The pulverized product may have an average particle diameter of about 20 µm to about 3.0 mm, for example, about 50 µm to about 2.0 mm, for example, about 100 µm to about 2.0 mm, or, for example, about 500 µm to about 2.0 mm. By pulverizing to such size, it may be advantageous to obtain a polyol having a hydroxyl value and molecular weight of a desired level in a high yield in the subsequent hydrolysis process. The average particle diameter of the pulverized product is a number average value of diameters measured based on cross sections of the particles, and may be obtained from a two-dimensional projection image of the particles. A method for obtaining the projected image is not particularly limited, but it may be obtained using, for example, a scanning electron microscope (SEM) or a transmission electron microscope (TEM).

The hydrolyzing of the pulverized product to obtain the first polyol may include processing the pulverized product with a composition for hydrolysis including at least one kind of alcohol; and reacting the pulverized product processed with the hydrolysis composition under a temperature condition of 130° C. to 200° C. By processing the pulverized product under such conditions, the polymer chain constituting the polishing pad waste is decomposed into a predetermined unit, so that a first polyol having at least two or more terminal hydroxyl groups (—OH) and having a desired predetermined hydroxyl value can be prepared.

In an embodiment, the weight ratio of the pulverized product to the hydrolysis composition may be from about 1:0.5 to about 1:6, for example, from about 1:0.8 to about 1:6, for example, from about 1:0.8 to about 1:5, for example, from about 1:1 to about 1:4, or, for example, from about 1:1 to 1:3.

In an embodiment, the reacting of the pulverized product processed with the composition for hydrolysis under a temperature condition of 30° C. to 200° C. may be performed for about 1 hour to about 8 hours, though the reaction time may be adjusted depending on the amount of the pulverized material, for example.

The temperature for reacting the pulverized product processed with the composition for hydrolysis is, for example, about 130° C. to about 200° C., for example, about 140° C. to about 200° C., for example, about 150° C. to about 200° C., for example from about 160° C. to about 200° C., or, for example, from about 160° C. to about 190° C.

In an embodiment, the composition for hydrolysis may include diethylene glycol (DEG).

In an embodiment, the obtaining of the first polyol may further include adding a catalyst as needed.

The first polyol having a hydroxyl value of about 200 mgKOH/g to about 900 mgKOH/g can be obtained by processing the polishing pad waste as described above. For example, the first polyol may have a hydroxyl number (OH-Value) of about 300 mgKOH/g to about 900 mgKOH/g, for example, about 300 mgKOH/g to about 800 mgKOH/g, for example, about 300 mgKOH/g to about 750 mgKOH/g, or, for example, about 450 mgKOH/g to about 650 mgKOH/g. When a polyol having such hydroxyl value is used as the first polyol together with the polishing variable layer, the physical and/or mechanical properties of the polishing constant layer derived therefrom can be advantageous for the realization of polishing performance. In addition, it may be more advantageous for obtaining the first polyol as a recycled polyol by processing the polishing pad waste.

The first urethane-based prepolymer may be prepared by reacting the first alcohol component including the first polyol and the first isocyanate component. With regard to each matter related to the first alcohol component and the first isocyanate component, all of the matters and technical advantages described above for them regarding the polishing pad may be integrally applied to the method for preparing a polishing pad. The preparing of the first urethane-based prepolymer may be performed at a temperature of about 60° C. to about 100° C. for example, about 60° C. to about 90° C., for example, about 70° C. to about 90° C., or, for example, about 70° C. to about 80° C. The reacting of the first alcohol component and the first isocyanate component in this temperature range can be more advantageous for obtaining the first urethane-based prepolymer satisfying the isocyanate group content (NCO %) that can be cured in a subsequent curing process to realize optimal physical/mechanical properties while having a molecular chain of an appropriate length.

The isocyanate group content (NCO %) of the first composition is from about 8% to 20% by weight, for example from about 8% to about 18% by weight, for example, from about 8% to about 15% by weight, for example, from about 9% to about 15% by weight, for example, from about 10% to about 15% by weight, or, for example, greater than about 10% by weight and up to about 15% by weight. The 'isocyanate group content (NCO %)' of the first composition means a percentage of the weight of isocyanate groups (—NCO) that is not reacted and exists as a free reactive group in the composition. The NCO % of the first composition may be calculated based on the total weight of the first composition excluding the first curing agent and the first blowing agent to be described later.

The viscosity of the first composition may be from about 100 cps to about 1,000 cps at about 80° C., for example, from about 200 cps to about 800 cps, for example, from about 200 cps to about 600 cps, for example, from about 200 cps to about 550 cps, or, for example, from about 300 cps to about 500 cps. By satisfying such a viscosity range, the first composition may have adequate flowability in a subsequent curing process, and may be easily prepared into a uniform cured product without voids.

The preparing of the polishing constant layer may further include mixing one selected from the group consisting of a first curing agent, a first blowing agent, and a combination thereof with the first composition including the first urethane-based prepolymer. With regard to each matter related to the first curing agent and the first blowing agent, all of the specific details and technical advantages described above regarding the polishing pad may be integrally applied to the method for preparing a polishing pad.

In this case, in an embodiment, the first blowing agent includes the solid phase blowing agent, and the method may include preparing a first-first composition by mixing the solid phase blowing agent with the first composition; and mixing the first curing agent with the first-first composition to prepare a first-second composition. As such, when proceeding in the order of the mixing of the curing agent after the mixing of the solid phase blowing agent, it can facilitate the preparing of the first composition with a viscosity suitable for the curing, and can be advantageous for improving the dispersibility of the solid phase blowing agent to finally secure a uniform pore structure.

For example, the viscosity of the first-first composition may be from about 1,000 cps to about 2,000 cps, for example, from about 1,000 cps to about 1,800 cps, for example, from about 1,000 cps to about 1,600 cps, or, for example, from about 1,000 cps to about 1,500 cps, at about 80° C. Satisfying such viscosity range may be more efficient for mixing additional components to adjust the final density of the second composition to the above-mentioned range.

In an embodiment, the first blowing agent includes a gas phase blowing agent, and the preparing of the polishing constant layer may further include injecting the gas phase blowing agent into the first-second composition. In this case, the gas phase blowing agent may be injected simultaneously with the first curing agent, or may be sequentially injected. The gas phase blowing agent may be selectively used as needed to control the final pore structure after the injection of the solid phase blowing agent.

When the gas phase blowing agent is injected into the first-second composition, for example, the injection rate of the gas phase blowing agent may be from about 0.8 L/min to about 2.0 L/min, for example, from about 0.8 L/min to about 1.8 L/min, for example, from about 0.8 L/min to about 1.7 L/min, for example, from about 1.0 L/min to about 2.0 L/min, for example, from about 1.0 L/min to about 1.8 L/min, or, for example, from about 1.0 L/min to about 1.7 L/min.

In an embodiment, the curing of the first composition may include: preparing a mold preheated to a first temperature; injecting the first composition into the preheated mold and curing the same; and post-curing the cured first composition under a second temperature condition higher than the first temperature.

In an embodiment, the temperature difference (T2−T1) between the first temperature (T1) and the second temperature (T2) may be from about 10° C. to about 40° C., for example, from about 10° C. to about 35° C., or, for example, from about 15° C. to about 35° C.

In an embodiment, the first temperature may be from about 60° C. to about 100° C., for example, from about 65° C. to about 95° C., or, for example, from about 70° C. to about 90° C. In an embodiment, the second temperature may be from about 100° C. to about 130° C., for example, from about 100° C. to about 125° C., or, for example, from about 100° C. to about 120° C.

When the multi-stage temperature condition as described above is applied to the curing of the first composition, the polishing constant layer 102 prepared through this can be more advantageous for securing appropriate mechanical properties in terms of compatibility with the polishing variable layer 101.

In the curing of the first composition, the injecting of the first composition into the preheated mold to cure the same may be performed for about 5 minutes to about 60 minutes, for example, about 5 minutes to about 40 minutes, for example, about 5 minutes to about 30 minutes, or, for example, about 5 minutes to about 25 minutes.

The post-curing of the cured first composition under the second temperature condition higher than the first temperature may performed for about 5 hours to about 30 hours, for example, about 5 hours to about 25 hours, for example, about 5 hours to about 20 hours, for example, about 5 hours to about 15 hours, or, for example, about 8 hours to about 12 hours.

In the step of curing the first composition, the mold may be a mold having a width of about 500 mm to about 1,500 mm, a length of about 500 mm to about 1,500 mm, and a height of about 1 mm to 1,000 mm. In an embodiment, the height of the mold may be from about 1 mm to about 10 mm. In another embodiment, the height of the mold may be from about 300 mm to about 1,000 mm.

The preparing of the polishing constant layer may further include processing the cured product of the first composition to a desired thickness. In the curing of the first composition, a plurality of polishing constant layers may be prepared from one cured product, or a single polishing constant layer may be prepared from one cured product, according to the height of the mold. For example, when the height of the mold is about 1 mm to about 10 mm, one polishing constant layer may be prepared from one cured product of the first composition discharged from the mold. In this case, the processing of the cured product of the first composition to a desired thickness may be a line turning step with the main purpose of surface processing. For example, when the height of the mold is about 300 mm to about 1,000 mm, a plurality of polishing constant layers may be prepared from one cured product of the first composition discharged from the mold. In this case, the processing of the cured product of the first composition to a desired thickness may be a cutting step whose main purpose is to partition a plurality of polishing constant layers.

The method for preparing a polishing pad 110 may include preparing the polishing variable layer 101, and the preparing of the polishing variable layer 101 may include preparing a second composition including a second urethane-based prepolymer; and curing the second composition. Descriptions for the second composition and the second urethane-based prepolymer are all the same as described above regarding the polishing pad 110.

In an embodiment, the preparing of the second composition may include preparing the second urethane-based prepolymer by reacting a second alcohol component including a second polyol having a hydroxyl number (OH-Value) of 50 mgKOH/g or more and less than 200 mgKOH/g; and a second isocyanate component. With regard to each matter related to the second polyol, the second alcohol component and the second isocyanate component, all of the matters and technical advantages described above for them regarding the polishing pad may be integrally applied to the method for preparing a polishing pad. The preparing of the second urethane-based prepolymer may be performed at a temperature of about 60° C. to about 100° C., for example, about 60° C. to about 90° C., for example, about 70° C. to about 90° C., or, for example, about 75° C. to about 86° C. The reacting of the second isocyanate component and the second alcohol component in this temperature range can be more advantageous for obtaining the second urethane-based prepolymer satisfying the isocyanate group content (NCO %) that can be cured in a subsequent curing process to realize optimal physical/mechanical properties while having a molecular chain of an appropriate length.

The viscosity of the second composition including the second urethane-based prepolymer may be from about 100 cps to about 100 cps at about 80° C., for example, from about 200 cps to about 800 cps, for example, from about 200 cps to about 600 cps, for example, from about 200 cps to about 550 cps, or, for example, from about 300 cps to about 500 cps. Satisfying such viscosity range can improve the preparing efficiency of the polishing variable layer 101 in a subsequent process, and can be advantageous for hardening to ensure proper hardness and density.

The preparing of the second composition may further include mixing the second curing agent and the second blowing agent with the second composition including the second urethane-based prepolymer. Descriptions for the second curing agent and the second blowing agent are all the same as described above with respect to the polishing pad 110. The second curing agent and the second blowing agent may be added simultaneously or sequentially.

When the second blowing agent includes a solid phase blowing agent, the preparing of the second composition may include: preparing a second-first composition by mixing the second urethane-based prepolymer and the solid phase blowing agent; and preparing a second-second composition by mixing the second-first composition and the second curing agent.

The viscosity of the second-first composition may be from about 1,000 cps to about 2,000 cps at about 80° C., for example, from about 1,000 cps to about 1,800 cps, for example, from about 1,000 cps to about 1,600 cps, or, for example, from about 1,000 cps to about 1,500 cps. Satisfying such viscosity range may be more efficient for mixing additional components to adjust the final density of the second composition to the above-mentioned range.

When the second blowing agent includes a gas phase blowing agent, the preparing of the second composition may include injecting the gas phase blowing agent into the second-second composition.

For example, the injection rate of the gas phase blowing agent may be from about 0.8 L/min to about 2.0 L/min, for example, from about 0.8 L/min to about 1.8 L/min, for example, from about 0.8 L/min to about 1.7 L/min, for example, from about 1.0 L/min to about 2.0 L/min, for example, from about 1.0 L/min to about 1.8 L/min, or, for example, from about 1.0 L/min to about 1.7 L/min.

In an embodiment, the curing of the second composition may include: preparing a mold preheated to a first temperature; injecting the second composition into the preheated mold and curing the same; and post-curing the cured second composition under a second temperature condition higher than the first temperature.

In an embodiment, the temperature difference (T2−T1) between the first temperature (T1) and the second temperature (T2) may be from about 10° C. to about 40° C., for example, from about 10° C. to about 35° C., or, for example, from about 15° C. to about 35° C.

In an embodiment, the first temperature may be from about 60° C. to about 100° C., for example, from about 65° C. to about 95° C., or, for example, from about 70° C. to about 90° C. In an embodiment, the second temperature may be from about 100° C. to about 130° C., for example, from about 100° C. to about 125° C., or, for example, from about 100° C. to about 120° C.

When the multi-stage temperature condition as described above is applied to the curing of the second composition, the polishing variable layer 101 prepared through this can be more advantageous in securing desired physical/mechanical properties such as hardness, tensile strength, and elongation rate.

In the curing of the second composition, the injecting of the second composition into the preheated mold to cure the same may be performed for about 5 minutes to about 60 minutes, for example, about 5 minutes to about 40 minutes, for example, about 5 minutes to about 30 minutes, or, for example, about 5 minutes to about 25 minutes.

The post-curing of the cured second composition under the second temperature condition higher than the first temperature may performed for about 5 hours to about 30 hours, for example, about 5 hours to about 25 hours, for example, about 10 hours to about 30 hours, for example, about 10 hours to about 25 hours, for example, about 12 hours to about 24 hours, or, for example, about 15 hours to about 24 hours.

The method for preparing the polishing pad 110 may further include processing the first surface 11.

The processing of the first surface 11 may include at least one step of (1) forming a groove on the first surface 11; (2) line turning the first surface 11; and (3) roughening the first surface 11.

In the step (1), the groove may include at least one of a concentric groove formed such that its members are spaced apart from each other by a predetermined spacing from the center of the polishing variable layer 101 on the first surface 11 toward the edge; and a radial groove formed such that its members continue from the center of the polishing variable layer 101 on the first surface 11 toward the edge.

In step (2), the line turning may be performed in a way that the first surface 11 is cut by a predetermined thickness with a cutting tool.

In step (3), the roughening may be performed in a way that the first surface 11 is processed with a sanding roller.

As described above, by applying the laminated structure of the polishing variable layer 101 and the polishing constant layer 102 to the polishing layer 10, it is possible to secure the advantage of being able to design precise and various physical properties in the thickness direction of the polishing layer 10, and it is possible to provide excellent polishing performance to the polished surface of the polishing object through the first surface 11 of the polishing variable layer 101.

The method for preparing the polishing pad 110 may further include laminating the cushion layer 20 on the second surface 12 of the polishing layer 10. Descriptions regarding the cushion layer 20 are the same as those described above regarding the polishing pad 110.

In an embodiment, the laminating of the cushion layer 20 may include applying a heat-melt adhesive on the second surface 12; applying a heat-melt adhesive on one surface of the cushion layer 20; and laminating the second surface 12 and the cushion layer 20 so that their surfaces on which the heat-melting adhesives have been applied come in contact with each other; and welding under pressure or heating conditions.

The heat-melt adhesive is not particularly limited, but may include, for example, one selected from the group consisting of a urethane-based adhesive, a silicone-based adhesive, an acrylic adhesive, and combinations thereof.

Referring to FIG. 3, the first adhesive layer 30 may be formed on the second surface 12 during the lamination process of the cushion layer 20.

In an embodiment, the method for preparing the polishing pad 110 may further include forming a second adhesive layer 40 on one surface of the cushion layer 20. The second adhesive layer 40, which is a configuration for attaching the polishing pad 110 to the surface plate of the polishing apparatus, may be derived from, for example, a pressure-sensitive adhesive (PSA), but is not limited thereto.

Specifically, in an embodiment, the forming of the second adhesive layer 40 may include: applying a pressure-sensitive adhesive to a surface opposite to the attachment surface of the cushion layer 20 to the second surface 12; and drying the pressure-sensitive adhesive.

In another embodiment, the forming of the second adhesive layer 40 may include: preparing an adhesive film including a pressure-sensitive adhesive; and attaching the adhesive film to a surface opposite to the attachment surface 12 of the cushion layer 20 to the second surface 12.

It is possible to prepare the polishing pad 110 through the preparing method as described above, and specifically, it is possible to obtain a polishing layer with precisely designed physical properties in the thickness direction thanks to the laminated structure of the polishing variable layer 101 and the polishing constant layer 102.

In another embodiment of the present disclosure, there is provided a method for preparing a semiconductor device, the method including: providing a polishing pad on a surface plate, the polishing pod including a polishing layer with a polishing surface; and polishing a polishing object while rotating the polishing pad and the polishing object relative to each other under a pressure condition, after arranging the polishing object so that its polished surface is in contact with the polishing surface, wherein the polishing layer includes a polishing variable layer having the polishing surface, and a polishing constant layer disposed on a rear surface side of the polishing surface of the polishing variable layer, and wherein the polishing constant layer includes a cured product of the first composition including the first urethane-based prepolymer, and the first urethane-based prepolymer is a reaction product of the first alcohol component including a first polyol having a hydroxyl number (OH-Value) of 200 mgKOH/g to 900 mgKOH/g with the first isocyanate component.

When describing all sub-components of the polishing pad in the method of preparing a semiconductor device, the specific details and technical advantages thereof described above regarding the polishing pad are integrated, applied to, and interpreted with the description of the method for preparing a semiconductor device below.

When the polishing pad 110 is applied to the method for preparing a semiconductor device, a semiconductor device of excellent quality can be produced under optimum physical property conditions realized by the structural and compositional characteristics of the polishing pad 110 as described above.

Specifically, when the polishing layer 10 including the laminated structure of the polishing variable layer 101 and the polishing constant layer 102 is applied as the polishing pad 110, and the cured product of the first composition including a first urethane-based prepolymer is included as the polishing constant layer, and the first urethane-based prepolymer is the reaction product of the first alcohol component including the first polyol having a hydroxyl number (OH-Value) of 200 mgKOH/g to 900 mgKOH/g with the first isocyanate component, the method for preparing a semiconductor device to which the polishing pad 110 is applied can secure excellent polishing results in terms of polishing flatness, polishing rate, and defect prevention, and can realize an environmentally friendly effect.

All descriptions for the first urethane-based prepolymer and its sub-composition are the same as described above regarding the polishing pad 110.

FIG. 4 is a schematic view schematically showing a method for preparing a semiconductor device according to an embodiment. Referring to FIG. 4, the polishing pad 110 may be provided on the surface plate 120. When the polishing pad 110 is provided on the surface plate 120, the first surface 11 of the polishing layer 10 may become the top surface, and the second surface 12 may be provided facing the surface plate 120.

In an embodiment, the polishing pad 110 and the surface plate 120 may be attached to each other through an adhesive layer. For example, the adhesive layer may be derived from a pressure-sensitive adhesive (PSA), but is not limited thereto.

The method for preparing the semiconductor device includes polishing a polishing object 130 while rotating the polishing pad 110 and the polishing object 130 relative to each other under a pressure condition, after arranging the polished surface of the polishing object 130 in contact with the first surface 11.

In an embodiment, the polishing object 130 may be a semiconductor substrate. For example, the polished surface of the semiconductor substrate may include a metal oxide film, a metal nitride film, or a metal film. In an embodiment, the polished surface may be a single layer made of one of a metal oxide, a metal nitride, and a metal. In another embodiment, the polished surface may be a composite film including at least two or more of a metal oxide, a metal nitride, and a metal.

In each of the metal oxide film, the metal nitride film, and the metal film, the metal component may include one selected from the group consisting of silicon (Si), copper (Cu), tantalum (Ta), titanium (Ti), tungsten (W), and combinations thereof.

In an embodiment, the polished surface of the polishing object 130 may be a single film made of a silicon oxide film. In another embodiment, the polished surface of the polishing object 130 may be a single film made of a copper film. In another embodiment, the polished surface of the polishing object 130 may be a composite film including a silicon oxide film. In another embodiment, the polished surface of the polishing object 130 may be a composite film including a copper film.

The load by which the polished surface of the polishing object 130 is pressed against the first surface 11 can be appropriately designed according to the type and purpose of the polished surface, but it may be, for example, from about 0.01 psi to about 20 psi, or, for example, from about 0.1 psi to about 15 psi. As described above, the polishing pad 110 includes the polishing layer having structural characteristics subdivided in the thickness direction by applying the laminated structure of the polishing variable layer 101 and the polishing constant layer 102, and the polishing pad can provide rigidity and elasticity suitable for various purposes to the polished surface under the pressure condition within the aforementioned range through these structural characteristics. As a result, when the polishing object 130 includes a semiconductor substrate, the final polishing result of the semiconductor substrate can be greatly improved in terms of polishing flatness and defect prevention.

The polishing pad 110 and the polishing object 130 may rotate relative to each other with the first surface 11 and the polished surface in contact with each other. In this case, the rotational direction of the polishing object 130 and the rotational direction of the polishing pad 110 may be the same, or opposite to each other. The first surface 11 and the polished surface of the polishing object 130 may be in direct contact with each other, or may be in indirect contact with each other through a component contained in a fluid slurry or the like. The rotation speeds of the polishing object 130 and the polishing pad 110 may be each selected from the range of about 10 rpm to about 500 rpm depending on the purpose, and may be each, for example, from about 30 rpm to about 200 rpm, but are not limited thereto. As described above, the polishing pad 110 may provide polishing performance corresponding to various purposes through structural features subdivided in the thickness direction. When the polishing object 130 and the polishing pad 110 each rotate at rotation speeds within the aforementioned range while being in contact with each other, their behaviors by centrifugal force and frictional force are correlated with the structural features of the polishing pad 110, so excellent polishing results can be produced in terms of polishing flatness and defect prevention for the polished surface.

In the method of preparing a semiconductor device, the polishing variable layer 101 may have a first polishing variability index of about 0.1 to about 11.0 according to Equation 1 above. In an embodiment, the first polishing variability index may be from about 0.1 to about 9.0, for example, from about 0.2 to about 9.0, for example, from about 0.2 to about 8.5, for example, from about 0.2 to about 8.0, for example, from about 0.2 to about 7.5, for example, from about 0.5 to about 7.5, for example, from about 0.8 to about 7.5, for example, from about 0.9 to about 7.5, for example, from about 1.0 to about 6.0, or, for example, from about 2.0 to about 3.5.

The polishing variable layer 101 is a region whose physical and/or chemical properties change during a polishing process of the method for preparing a semiconductor device to which the polishing pad 110 is applied, and has a predetermined lifespan in terms of providing a desired level of polishing performance. The lifespan introduction time of the polishing variable layer 101 refers to an arbitrary time point between after the polishing variable layer 101 itself or the polishing pad 110 is manufactured and before it is applied to a process. Additionally, the lifespan end time of the polishing variable layer 101 refers to a time point when the polishing variable layer 101 no longer realizes the polishing performance, and thus the polishing variable layer 101 itself or the entire polishing pad 110 needs to be replaced.

The first polishing variability index according to Equation 1 above using the surface roughnesses (Ri, Rf) and the total thicknesses (Ti, Tf) of the polishing pad 110 at the lifespan introduction time and the lifespan end time of the polishing variable layer 101 as factors is an index indicating the variable performance of the polishing variable layer 101, and by retaining a variability corresponding to the value of Equation 1 above represented in the aforementioned range, the polishing variable layer 101 as apart of the polishing layer 10 can have structural features optimized for polishing efficiency, and at the same time, realize a constant polishing performance throughout its lifetime, so it can be more advantageous for mass-producing semiconductor devices of the same quality.

Ti may be, for example, from about 800 μm to about 5000 μm, for example, from about 1000 μm to about 4000 μm, for example, from about 1000 μm to 3000 μm, for example, from about 1500 μm to about 3000 μm, for example, from about 1700 μm to about 2700 μm, or, for example, from about 2000 μm to about 3500 μm, but is not limited thereto.

Ri may be, for example, from about 5 μm to about 15 μm, for example, from about 5 μm to about 12 μm, or, for example, from about 5 μm to 10 μm, but is not limited thereto.

In an embodiment, when Ti and Ri each satisfy the above-mentioned ranges, and at the same time, the first polishing variability index satisfies the above-mentioned range, it may be more advantageous in terms of realizing the polishing performance and the structural characteristics of the polishing variable layer 101.

In an embodiment, the polishing pad 110 may include at least one groove 14 on the first surface 11, the groove having a depth d1 smaller than or equal to the total thickness D1 of the polishing variable layer 101. The groove 14 can play a role in appropriately realizing physical polishing characteristics by adjusting the fluidity of the polishing liquid or polishing slurry supplied to the first surface a during the polishing process using the polishing pad 110, or by adjusting the size of the area in which the first surface 11 and the polished surface of a polishing object are in direct contact with each other.

For example, the polishing pad 110 may include a plurality of grooves 14 in the first surface 11. In an embodiment, the planar shape of the polishing pad 110 may be substantially circular, and the plurality of grooves 14 may have a concentric circular structure in which they are spaced apart at a predetermined distance from the center on the planar surface of the polishing pad 110 toward the edge. In another embodiment, the plurality of grooves 14 may have a radial structure in which they are continuously formed from the center on the planar surface of the polishing pad 110 toward the edge. In still another embodiment, the plurality of grooves 14 may include concentric circular grooves and radial grooves at the same time.

In the polishing variable layer 101, which is a region from the first surface 11 to the separable interface 13, the first surface 11 may include at least one groove 14. In this case, in the method for preparing a semiconductor device, a second polishing variability index according to Equation 2 above of the polishing variable layer 101 may be from about 0.1 to about 3.5, for example, from about 0.1 to about 3.3, for example, from about 0.1 to about 3.0, for example, from about 0.1 to about 2.0, for example, from about 0.3 to about 1.8, for example, from about 0.5 to about 1.5, for example, from about 0.5 to about 1.2, or, for example, from about 0.5 to 1.0.

The description of the lifespan introduction time and the lifespan end time of the polishing variable layer 101 is the same as described above with respect to the first polishing variability index according to Equation 1 above. When the second polishing variability index of the polishing variable layer 101 satisfies the above-mentioned range, the polishing variable layer 101 can provide a structure optimized in terms of fluidity of the polishing liquid or polishing slurry, and a direct contact area provided with respect to the polished surface can be secured at an appropriate level, which may be more advantageous for securing a polishing rate within a target range.

The Gi may be, for example, from about 600 μm to about 900 μm, for example, from about 650 μm to about 900 μm, or, for example, from about 700 μm to about 900 μm, but is not limited thereto.

In an embodiment, when Ri and Gi each satisfy the above-mentioned ranges, and at the same time, the second polishing variability index satisfies the above-mentioned range, it may be more advantageous in terms of realizing the polishing performance by the structural characteristics of the polishing variable layer 101.

When the first surface 11 includes at least one groove 14 having a depth equal to or smaller than the total thickness of the polishing variable layer 101, the rate of change (%) of the depth of the groove 14 in the polishing variable layer 101 according to Equation 3 above may be from about 20% to about 100%.

Referring to FIG. 1, the depth d1 of the groove 14 is changed from the depth Gi at the lifespan introduction time to the depth Gf at the lifespan end time during the polishing process. Specifically, as the first surface 11 and the polished surface of a polishing object are polished by physical contact with each other, thereby cutting the first surface 11, the depth d1 of the groove 14 gradually becomes shallower. In this regard, the value of Equation 3 above employing the depth Gi of the groove at the lifespan introduction time and the depth of the groove Gf at the lifespan end time as factors can satisfy the above-mentioned range when physical characteristics such as the elongation, tensile strength, hardness and the like of the polishing variable layer 101 are properly supported. Specifically, if the physical properties of the polishing variable layer 101 are not properly supported, the influence on the polishing performance induced by a change in the fluidity of the polishing slurry or the like increases with the more shallow depth d1 of the groove, and so there is a concern regarding the occurrence of the abrupt deterioration of the overall polishing performance. When the value of Equation 3 above satisfies the above-mentioned range, the polishing variable layer 101 according to an embodiment can exhibit the optimum physical properties corresponding thereto, based on which, even if the depth d1 of the groove becomes shallow, the influence on the polishing performance can be minimized to realize excellent polishing performance throughout the polishing process according to the method for preparing a semiconductor device.

When the polishing pad 110 includes at least one groove in the first surface 11, the width w1 of the groove 14 may be from about 0.2 mm to about 1.0 mm, for example, from about 0.3 mm to about 0.8 mm, or, for example, from about 0.4 mm to about 0.7 mm. When the width of the groove 14 satisfies the aforementioned range, the size of the contact area between the polished surface of the polishing object 130 and the first surface 11 can be properly secured, the fluidity of the polishing liquid or polishing slurry applied to the first surface 11 is secured at an appropriate level, so that the final polishing performance can be excellently realized.

When the polishing pad 110 includes a plurality of grooves 14 on the first surface 11, the pitch p1 of the groove 14, which is defined as the spacing between two adjacent grooves 14, can also be appropriately designed under the same context as the width w1 of the groove 14, thereby contributing to the realization of the polishing performance required in the method for preparing a semiconductor device. For example, the pitch p1 of the grooves 14 may be from about 1.5 mm to about 5.0 mm, for example, from about 1.5 mm to about 4.0 mm, or, for example, from about 1.5 mm to about 3.0 mm.

Referring to FIG. 4, in an embodiment, the method for preparing a semiconductor device may further include supplying a polishing slurry 150 onto the first surface 11 of the polishing pad 110. For example, the polishing slurry 150 may be supplied onto the first surface 11 through a supply nozzle 140.

The flow rate of the polishing slurry 150 sprayed through the supply nozzle 140 may be from about 10 ml/min to about 1,000 ml/min, for example, from about 10 ml/min to about 800 ml/min, or, for example, from about 50 ml/min to about 500 ml/min, but is not limited thereto.

The polishing slurry 150 may include a silica slurry or a ceria slurry, but is not limited thereto.

Referring to FIG. 4, the polishing object 130 may be polished while being mounted on a polishing head 160 and being pressed to the first surface 11 with a predetermined load. When being mounted on the polishing head 160, the polishing object 130 may be arranged such that its polished surface faces the first surface 11. The load by which the polished surface of the polishing object 130 is pressed against the first surface 11 can be appropriately designed according to the type and purpose of the polished surface, but it may be, for example, from about 0.01 psi to about 20 psi, or, for example, from about 0.1 psi to about 15 psi.

In an embodiment, in order to maintain the first surface 11 of the polishing pad 110 in a state suitable for polishing, the method for preparing a semiconductor device may further include processing the first surface 11 through a conditioner 170 at the same time as polishing the polishing object 130.

The conditioner 170 may perform a role of roughening the first surface 11 by applying a pressing action to the first surface 11 while rotating at a predetermined rotation speed. The rotation speed of the conditioner 170 may be, for example, from about 50 rpm to about 150 rpm, or, for example, from about 80 rpm to about 120 rpm. Through the surface treatment by rotation of the conditioner 170, the first surface 11 can maintain an optimal surface state throughout the polishing process, and it is possible to obtain an effect of prolonging the polishing lifespan.

The pressing pressure of the conditioner 170 against the first surface 11 may be, for example, from about 1 lbf to about 12 lbf, or, for example, from about 3 lbf to about 9 lbf. Through the surface treatment performed while pressing the conditioner 170 under these conditions, the first surface 11 can maintain an optimal surface state throughout the polishing process, and it is possible to obtain an effect of prolonging the polishing lifespan.

Hereinafter, specific examples of the present disclosure are presented. However, the examples described below are merely for specifically illustrating or explaining the present disclosure, and the scope of the present disclosure is not construed as being limited by these examples, but is determined by the claims.

EXAMPLES AND COMPARATIVE EXAMPLES

Example 1

By mixing 25 parts by weight of 2,6-toluene diisocyanate (2,6-TDI) and 14 parts by weight of 4,4'-dicyclohexylmethane diisocyanate (H12MDI) relative to 100 parts by weight of 2,4-toluene diisocyanate (2,4-TDI), the second isocyanate component was prepared. 130 parts by weight of a second polyether-based polyol having a weight average molecular weight of 1,000 (±50) g/mol and a hydroxyl value (OH-v) of 112 (±10) mgKOH/g with respect to 100 parts by weight of the total of the second isocyanate component was prepared, and a second alcohol component was prepared by mixing 14 parts by weight of diethylene glycol (DEG) having a weight average molecular weight (Mw) of 106 g/mol with respect to 100 parts by weight of the total isocyanate component. A second composition including the second urethane-based prepolymer was prepared by inputting the mixed raw material including the isocyanate component and the polyol component into a four-neck flask and reacting the same at 80° C. The second composition was prepared so that its isocyanate group content (NCO %) was 9% by weight. 4,4'-methylenebis(2-chloroaniline) (MOCA) having an amine group (—$NH_2$) reactive group was mixed with the second composition as a second curing agent, wherein the molar ratio of the NCO groups in the second composition to the $NH_2$ groups of the MOCA was 1.0.96. In addition, 1.0 parts by weight of a solid phase blowing agent (Akzonobel) as the second blowing agent and 1.0 parts by weight of a silicone surfactant (OFX-193) were mixed with respect to 100 parts by weight of the total second composition. The second composition was injected at a discharge rate of 10 kg/min into a mold having a width of 1,000 mm, a length of 1,000 mm, and a height of 3 mm, and preheated to 90° C., while at the same time, Nitrogen (N2) gas as a gas phase blowing agent was injected at an injection rate of 1.0 L/min for the same period of time as the injection time of the second composition. Then, the second composition was subjected to a post-curing reaction under a temperature condition of 110° C. to prepare a sheet. The sheet was subjected to a line turning process, and concentric grooves having a width w1 of 0.5 mm, a pitch p1 of 3.0 mm, and a depth d1 of 0.85 mm were made on its surface to prepare a polishing variable layer having a thickness of 1.0 mm.

The by-product generated during groove and thickness processing of the polishing variable layer was pulverized to have an average particle diameter of 1 to 2 mm (average particle diameter of about 1.5 mm) using a grinding machine. 300 g of the pulverized product was mixed with diethylene glycol (DEG) in a weight ratio of 1:2, and then it was processed for 6 hours under a temperature condition of 170° C. to obtain a recycled polyol having a hydroxyl value (OH-v) of 600 (20) mgKOH/g. The first alcohol component containing the recycled polyol as a first polyol was prepared, and the first isocyanate component including toluene diisocyanate (TDI) but having an isocyanate group content (NCO %) of 48% by weight was prepared. The first urethane-based prepolymer was prepared by reacting the first alcohol component and the first isocyanate component, wherein the content of each component was adjusted so that the isocyanate group content (NCO %) of the first composition including the first urethane-based prepolymer was 12% by weight. An alcohol curing agent (MCNS, LA-750) having a hydroxyl value (OH-v) of 750 mgKOH/g while including a hydroxyl group (—OH) as a reactive group was mixed as a first curing agent in the first composition, wherein the molar ratio of NCO groups in the first composition to OH groups of the curing agent was 1:1. In addition, 1.0 parts by weight of a silicone-based surfactant (OFX-193) was mixed with respect to 100 parts by weight of the total first composition. The first composition was injected at a discharge rate of 10 kg/min into a mold having a width of 1,000 mm, a length of 1,000 mm, and a height of 100 mm, and preheated to 90° C., while at the same time, Nitrogen (N2) gas as a gas phase blowing agent was injected at an injection rate of 1.0 L/min for the same period of time as the injection time of the first composition. Then, the second composition was subjected to a post-curing reaction for 10 hours under a temperature condition of 110° C. to prepare a cured product. A plurality of polishing constant layers were prepared by cutting the cured product of the second composition to a thickness of 1 mm.

Meanwhile, a cushion layer having a structure in which a polyester resin non-woven fabric was impregnated with a urethane-based resin, and having a thickness of 1.1 mm was prepared.

Double-sided adhesive tapes each were attached to the rear surface opposite to the surface of the polishing variable layer on which the groove was generated, both surfaces of the polishing constant layer, and one surface of the cushion layer, and the polishing variable layer, the polishing constant layer, and the cushion layer were sequentially stacked, while being arranged such that the adhesive tape attachment surfaces were in contact with each other, and then laminated to prepare a polishing pad having a total thickness of 3.2(±0.5) mm.

Comparative Example 1

The polishing variable layer was prepared in the same manner as in Example 1 except that it was prepared without the polishing constant layer, including the polishing variable layer and the cushion layer, and the first composition was injected into a mold preheated to 90° C. and having a width of 1,000 mm, a length of 1,000 mm, and a height of 3 mm, and the polishing variable layer was prepared by line turning so that the final thickness of the cured product of the first composition was 2.0 mm. In addition, the polishing pad was manufactured in the same manner except that double-sided adhesive tapes were attached to a rear surface of the surface on which the grooved surface of the polishing variable layer is formed; and one surface of the cushion layer, and the polishing pad with a total thickness of 3.2 (±0.5) mm was obtained by placing and laminating so that the attachment surfaces of the adhesive tapes are in contact with each other.

TABLE 1

| | | | Example 1 | Comparative Example 1 |
|---|---|---|---|---|
| Polishing constant layer composition | First polyurethane-based prepolymer | First isocyanate component | TDI (NCO %: 48) | — |
| | | First alcohol component | First polyol (OH-v: 600) | — |
| | First curing agent | | OH group-containing curing agent (OH-v: 750) | — |

TABLE 1-continued

| | | | Example 1 | Comparative Example 1 |
|---|---|---|---|---|
| | | Second blowing agent | Gas phase blowing agent ($N_2$) | — |
| | | Surfactant | silicon-based polymer | — |
| | | NCO % of first composition including first urethane-based prepolymer | 12 wt % | — |
| | | Molar ratio of NCO in first composition to OH in first curing agent | 1:1 | — |
| Polishing variable region composition | Second polyurethane-based prepolymer | Second isocyanate component | 2,4-TDI 2,6-TDI $H_{12}$MDI | 2,4-TDI 2,6-TDI $H_{12}$MDI |
| | | Second alcohol component | Second polyol (OH-v: 112) DEG | Second polyol (OH-v: 112) DEG |
| | Second curing agent | | $NH_2$ group-containing curing agent | $NH_2$ group-containing curing agent |
| | Second blowing agent | | Solid phase blowing agent Gas phase blowing agent ($N_2$) | Solid phase blowing agent Gas phase blowing agent ($N_2$) |
| | Surfactant | | silicon-based polymer | silicon-based polymer |
| | NCO % of second composition including first urethane-based prepolymer | | 9.0% | 9.0% |
| | Molar ratio of NCO in second composition to $NH_2$ in second curing agent | | 1:0.96 | 1:0.96 |
| Thickness [mm] | Polishing variable region | | 1.0 | 2.0 |
| | Polishing constant layer | | 1.0 | — |
| | Cushion layer | | 1.1 | 1.1 |
| | Total polishing pad | | 3.2 | 3.2 |

<Measurement and Evaluation>

Experimental Example 1: Polishing Pad Hardness Evaluation

For each of the polishing pads of the Examples and Comparative Examples. Shore D hardness of the first surface, which was the polishing surface, was measured. Specifically, samples were prepared by cutting the width and length to a size of 5 cm×3 cm size, and each sample was stored at 25° C. for 12 hours, and then measured using a Shore D durometer. The results are as shown in Table 2 below.

Experimental Example 2: Polishing Pad Compressibility Evaluation

For each of the polishing pads of the Examples and Comparative Examples, the initial thickness (D1) at the no-load state, and the deformed thickness (D2) by pressing under pressure conditions of pressing the sample with a cylindrical weight of 2400 g having a cross-sectional area of a diameter of 25 mm and for 1 minute at room temperature were measured, and then the compression ratio (%) was derived using the formula (D1−D2)/D1×100.

Experimental Example 3: Polishing Variability Evaluation

For each of the Examples and Comparative Examples, the surface roughness (Ri) of the first surface of the polishing variable layer after each polishing pad was manufactured and before being applied to the polishing process was measured based on the centerline average roughness (Ra), and the total thickness (Ti) of each polishing pad and the depth (Gi) of the groove on each first surface were measured.

Then, for each polishing pad, silicon oxide ($SiO_2$) was deposited on a silicon wafer having a diameter of 300 mm by a chemical vapor deposition (CVD) process. The polishing pad was attached to the CMP equipment, and the surface of the silicon oxide layer of the silicon wafer was installed to face the polishing surface of the polishing pad. The silicon wafer was pressed onto the polishing surface with a load of 3.0 psi while supplying the calcined ceria slurry (KC Tech Company, ACS 350) onto the polishing pad at a rate of 250 mL/min, and the silicon oxide film was polished at a rotation speed of 100 rpm of each of the polishing pad and the silicon wafer. After the polishing was performed until the polishing rate changed by 20% from the initial polishing rate, the silicon wafer was removed from the carrier, mounted on a spin dryer, washed with distilled water, and dried with nitrogen for 15 seconds.

For each polishing pad, the time point at which the polishing rate changed by 20% from the initial polishing rate was regarded as the lifespan end time of the polishing pad, and the surface roughness (Rf) of the first surface of the polishing variable layer of each dried polishing pad was measured based on the centerline average roughness (Ra), and the total thickness (Tf) of each polishing pad and the depth (Gf) of the groove on each first surface were measured.

Then, the first polishing variability index and the second polishing variability index were derived using Equations 1 and 2 above, and the results are shown in Table 1 below.

Experimental Example 4: Polishing Performance Evaluation

For each polishing pad of the Examples and Comparative Examples, polishing was performed in the same manner as in Experimental Example 3 above, and then, each polishing performance was evaluated as follows. The results are as shown in Table 1.

(1) Average Polishing Rate

Polishing was performed in the same manner as in Experimental Example 3 above, but the film thickness change before and after the polishing was measured using an optical interference thickness measuring device (SI-F80R, Kyence Company) for the dried silicon wafer after polishing for 1 minute. Then, the polishing rate was calculated using the following equation. In this way, the polishing rate was measured a total of 5 times, and a number average value was obtained, which was used as the average polishing rate.

Polishing rate(A/min)=polishing thickness of silicon wafer(A)/polishing time (min)

(2) Defect

The polishing was performed in the same manner as in Experimental Example 3 above, but the polished surface of the polishing object after polishing for 1 minute was observed with the naked eye to derive the number of defects such as scratches. Specifically, after polishing, the silicon wafer was moved to a cleaner where it was washed for 10 seconds using 1% hydrogen fluoride (HF) and purified water (DIW), and for 10 seconds using 1% nitric acid (H2NO3) and purified water (DIW). Thereafter, it was moved to a spin dryer where it washed with purified water (DIW), and then dried with nitrogen (N2) for 15 seconds. Changes in defects before and after the polishing of the dried silicon wafer were observed with the naked eye using a Defect measuring equipment (XP+, Tenkor Company).

(3) Polishing Flatness

Polishing was performed in the same manner as in Experimental Example 3 above, but after polishing for 1 minute, the in-plane film thickness of the wafer was measured at 49 locations, and the polishing flatness (WIWNU: Within Wafer Non Uniformity,%) was derived using the equation of (standard deviation of polished thickness (Å)/average polishing thickness (Å))×100.

TABLE 2

|  |  |  | Example 1 | Comparative Example 1 |
|---|---|---|---|---|
| Polishing pad physical properties Thickness [mm] | First surface hardness (Shore D) |  | 55.5 | 55.5 |
|  | Compressibility (%) |  | 1.0 | 0.9 |
|  | Polishing variable region |  | 1.0 | 2.0 |
|  | Polishing constant layer |  | 1.0 | — |
|  | Cushion layer |  | 1.1 | 1.1 |
|  | Total polishing pad |  | 3.2 | 3.2 |
| Polishing variability | Lifespan introduction time [μm] | Surface roughness (Ri) | 7.5 | 7.5 |
|  |  | Polishing pad total thickness (Ti) | 3200.0 | 3200.0 |
|  |  | Groove depth (Gi) | 850.0 | 850.0 |
|  | Lifespan end time [μm] | Surface roughness (Rf) | 4.4 | 4.3 |
|  |  | Polishing pad total thickness (Tf) | 2680 | 2695 |
|  |  | Groove depth (Gf) | 330 | 345 |
|  | First polishing variability index |  | 2.54 | 2.70 |
|  | Second polishing variability index |  | 0.68 | 0.72 |
|  | Rate of change of groove depth [%] |  | 61.18 | 59.41 |
| Polishing performance | Average polishing rate [W, Å/min] |  | 665 | 653 |
|  | Average polishing rate [Oxide, Å/min] |  | 4312 | 4394 |
|  | Defect [number] |  | 2 | 2 |
| Yield | Number of secured polishing pads per 100 kg of composition |  | 50 | 30 |

Referring to Table 2 above, the polishing pad of Example 1 above included the polishing layer with the laminated structure of the polishing variable layer and the polishing constant layer, and applied, as the polishing constant layer, the recycled layer in which the recycled polyol prepared by processing pulverized particles that had been obtained by pulverizing a by-product generated during groove and thickness processing of the polishing variable layer to an average particle diameter of 1 to 2 mm (average particle diameter of about 1.5 mm) using a pulverizer was applied. Comparative Example 1 above was a polishing pad without the application of such recycled layer, and the polishing pad of Example 1 above realized polishing performances equivalent to that of Comparative Example 1 above even though it included the recycled configuration, so it can be confirmed that in addition to the original polishing function, an improved effect was obtained in terms of process productivity and economic feasibility.

REFERENCE SIGN LIST

110: Polishing pad
10: Polishing layer
101: Polishing variable layer
102: Polishing constant layer
11: First surface
12: Second surface
13: Separable interface
14: Groove
20: Cushion layer
30: First adhesive layer
40: Second adhesive layer
w1: Width of the groove
p1: Pitch of the groove
d1: Depth of the groove
D1: Thickness of the polishing variable layer 15: Pore
120: Surface plate
130: Semiconductor substrate
140: Nozzle
150: Polishing slurry
160: Carrier
170: Conditioner

The invention claimed is:

1. A polishing pad comprising:
a polishing layer,
wherein the polishing layer includes:
a polishing variable layer having a polishing surface; and
a polishing constant layer disposed on a rear surface side of the polishing variable layer opposite to the polishing surface,
wherein the polishing constant layer includes a cured product of a first composition including a first urethane-based prepolymer, and the polishing variable layer includes a cured product of a second composition including a second urethane-based prepolymer,
wherein the first urethane-based prepolymer is a reaction product of a first alcohol component including a first polyol having a hydroxyl value (Hydroxyl number, OH-Value) of about 200 mgKOH/g to about 900 mgKOH/g, a first curing agent, and a first isocyanate component,
wherein the second urethane-based prepolymer is a reaction product of a second alcohol component including a second polyol having a hydroxyl value (Hydroxyl number, OH-Value) of 50 mgKOH/g or more and less than 200 mgKOH/g, a second curing agent, and a second isocyanate component,
wherein the first curing agent includes a compound having a hydroxyl group (—OH) as a reactive group, and the second curing agent includes a compound having an amine group (—NH2) as a reactive group, and
wherein a content of isocyanate group (—NCO) in the first composition is greater than a content of isocyanate group (—NCO) in the second composition.

2. The polishing pad of claim 1, wherein an interface between the polishing variable layer and the polishing constant layer is a separable interface.

3. The polishing pad of claim 1, wherein each of the polishing variable layer and the polishing constant layer includes at least one layer.

4. The polishing pad of claim 1, wherein the first polyol has a weight average molecular weight (Mw) of 100 g/mol to 1200 g/mol.

5. The polishing pad of claim 1, wherein the first isocyanate component is selected from the group consisting of aromatic diisocyanate, aliphatic diisocyanate, cycloaliphatic diisocyanate, and combinations thereof.

6. The polishing pad of claim 1, wherein the isocyanate group (—NCO) content of the first composition is 8% to 20% by weight.

7. The polishing pad of claim 1, wherein the first isocyanate component has an isocyanate group content (NCO %) of 30% to 65% by weight.

8. The polishing pad of claim 1,
wherein the hydroxyl value (Hydroxyl number, OH-Value) of the compound having the hydroxyl group (—OH) as the reactive group is more than 600 mgKOH/g and 900 mgKOH/g or less.

9. The polishing pad of claim 8, wherein a molar ratio (NCO:OH) of the isocyanate group (—NCO) present as a free reactive group of the first composition and the hydroxyl group (—OH) derived from the first curing agent is 1:2 to 2:1.

10. The polishing pad of claim 1, wherein a content of the first curing agent of the total first composition is 15% to 30% by weight.

11. The polishing pad of claim 1,
wherein a molar ratio of isocyanate groups (—NCO) of the second composition to amine groups (—NH2) of the second curing agent is 1:0.80 to 1:1.20.

12. The polishing pad of claim 1, wherein the content of isocyanate groups (—NCO) of the second composition is 5% to 11% by weight.

13. The polishing pad of claim 1, wherein the second polyol has a weight average molecular weight (Mw) of 100 g/mol to 3,000 g/mol.

14. The polishing pad of claim 1, wherein the polishing variable layer is of a porous structure including a plurality of pores.

15. The polishing pad of claim 1, wherein a compressibility of the polishing pad is 0.3% to 1.8%.

16. A method for preparing a semiconductor device, the method comprising:
providing the polishing pad of claim 1 on a surface plate; and
polishing a polishing object while rotating the polishing pad and the polishing object relative to each other under a pressure condition after arranging a polished surface of the polishing object to be in contact with the polishing surface.

17. The method of claim 16, wherein a load by which the polished surface of the polishing object is pressed against the polishing surface of the polishing layer is from 0.01 psi to 20 psi.

* * * * *